United States Patent
Mizoguchi et al.

(10) Patent No.: US 9,186,823 B2
(45) Date of Patent: Nov. 17, 2015

(54) MOLDING METHOD AND MOLD THEREFOR

(71) Applicant: KAGA SANGYO CO., LTD., Nagoya-shi (JP)

(72) Inventors: Osamu Mizoguchi, Nagoya (JP); Takayuki Nomura, Inuyama (JP); Hitoshi Tsujikawa, Nagoya (JP); Yoshiki Ikeda, Nagoya (JP)

(73) Assignee: KAGA SANGYO CO., LTD., Nagoya-Shi (JP)

( * ) Notice: Subject to any disclaimer, the term of this patent is extended or adjusted under 35 U.S.C. 154(b) by 0 days.

(21) Appl. No.: 14/087,784

(22) Filed: Nov. 22, 2013

(65) Prior Publication Data
US 2014/0186483 A1    Jul. 3, 2014

Related U.S. Application Data

(62) Division of application No. 13/090,699, filed on Apr. 20, 2011, now Pat. No. 8,617,453.

(60) Provisional application No. 61/325,976, filed on Apr. 20, 2010.

(51) Int. Cl.
| | |
|---|---|
| *B29C 37/00* | (2006.01) |
| *B29C 45/14* | (2006.01) |
| *B29C 67/24* | (2006.01) |
| *B29L 11/00* | (2006.01) |

(52) U.S. Cl.
CPC ......... *B29C 37/006* (2013.01); *B29C 45/14065* (2013.01); *B29C 45/14639* (2013.01); *B29C 67/246* (2013.01); *B29L 2011/00* (2013.01)

(58) Field of Classification Search
CPC .................. B29C 37/006; B29L 2011/00
See application file for complete search history.

(56) References Cited

U.S. PATENT DOCUMENTS

| | | | | |
|---|---|---|---|---|
| 2,304,723 | A | * 12/1942 | Wolff et al. | 264/114 |
| 2,319,479 | A | * 5/1943 | Ryder | 425/451.9 |
| 2,465,819 | A | 3/1949 | Rubissow | |

(Continued)

FOREIGN PATENT DOCUMENTS

| | | |
|---|---|---|
| GB | 1387402 A | 3/1975 |
| JP | S61-119602 A | 6/1986 |

(Continued)

OTHER PUBLICATIONS

English translation of International Preliminary Report on Patentability from counterpart PCT application No. PCT/JP2011/059438.

(Continued)

*Primary Examiner* — Jeremiah Smith
(74) *Attorney, Agent, or Firm* — J-TEK Law PLLC; Jeffrey D. Tekanic; Scott T. Wakeman

(57) ABSTRACT

Molding methods and molds for making a synthetic resin molded product include disposing a curable liquid resin mixture in a recess of a female mold. The curable liquid resin mixture is then simultaneously agitated and degassed by a mixer while under a partial vacuum. More specifically, at least the female mold is orbited around an orbital axis while being rotated about a rotational axis that is eccentric to the orbital axis. After being thoroughly mixed and degassed, the liquid mixture is then cured in the mold unit.

19 Claims, 28 Drawing Sheets

(56) References Cited

U.S. PATENT DOCUMENTS

| | | | |
|---|---|---|---|
| 3,778,033 A | 12/1973 | Pullman | |
| 4,110,389 A | 8/1978 | Giehler et al. | |
| 4,271,114 A * | 6/1981 | Ohno | 264/114 |
| 4,359,443 A * | 11/1982 | Michaels | 264/328.2 |
| 4,666,650 A | 5/1987 | Carrow | |
| 4,687,044 A | 8/1987 | Wallace | |
| 4,810,183 A | 3/1989 | Place et al. | |
| 4,998,872 A | 3/1991 | Funakubo et al. | |
| 5,980,792 A | 11/1999 | Chamlee | |
| 6,555,037 B1 | 4/2003 | Payne | |
| 2007/0025180 A1 | 2/2007 | Ishii | |

FOREIGN PATENT DOCUMENTS

| | | |
|---|---|---|
| JP | S63-251206 A | 10/1988 |
| JP | H03-193127 A | 8/1991 |
| JP | H09-029086 A | 2/1997 |
| JP | H11-104404 A | 4/1999 |
| JP | H11-319406 A | 11/1999 |
| JP | 2000-271465 A | 10/2000 |
| JP | 2005-081341 A | 3/2005 |
| JP | 2007-136714 A | 6/2007 |

OTHER PUBLICATIONS

English translation of International Search Report from counterpart PCT application No. PCT/JP2011/059438.
Office Action mailed Jul. 2, 2013 from Japanese Patent Office Action for related JP appl. No. 2011-255763, including English translation thereof.
Extended European Search Report mailed Jul. 9, 2014 in counterpart EP application No. 11768970.3, including European Search Opinion, Supplementary European Search Report and specification, claims and abstract of examined application.

* cited by examiner

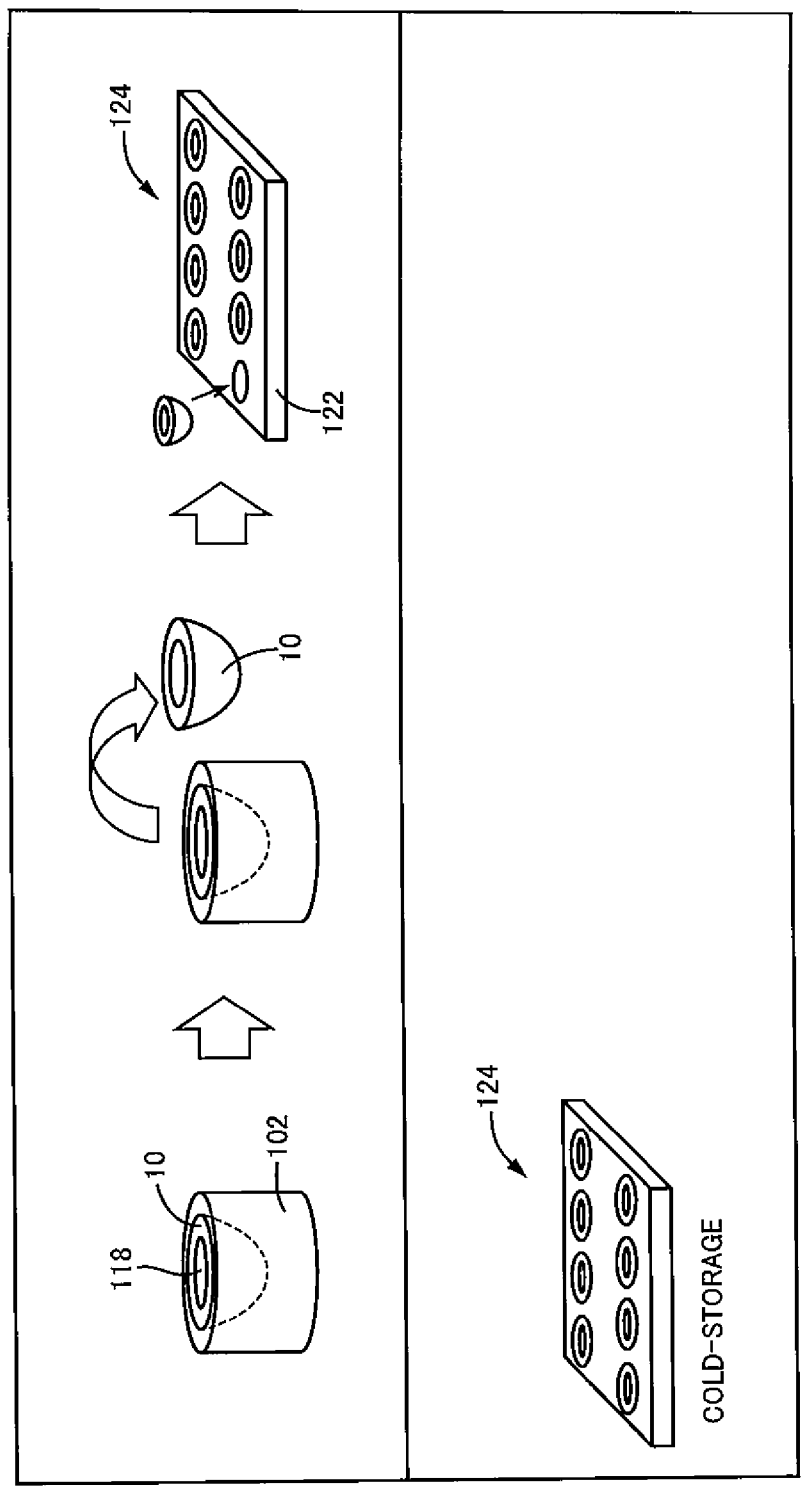

EXPLODED

ASSEMBLED

| AGITATION/DEGASSING PROCESS | |
|---|---|
| S31 | ASSEMBLY |
| S32 | DISPOSE |
| S33 | PREVENT |
| S34 | FIRST AGITATION/DEGASSING |
| S35 | PERMIT |
| S36 | SUBSEQUENT AGITATION/DEGASSING |

FIG.21

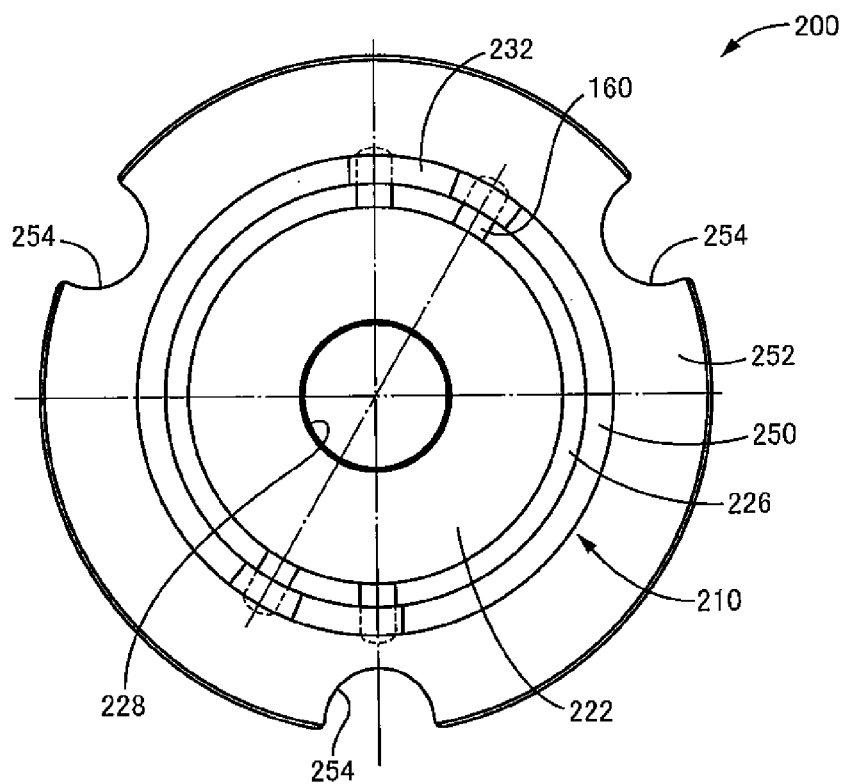
FIG.22A
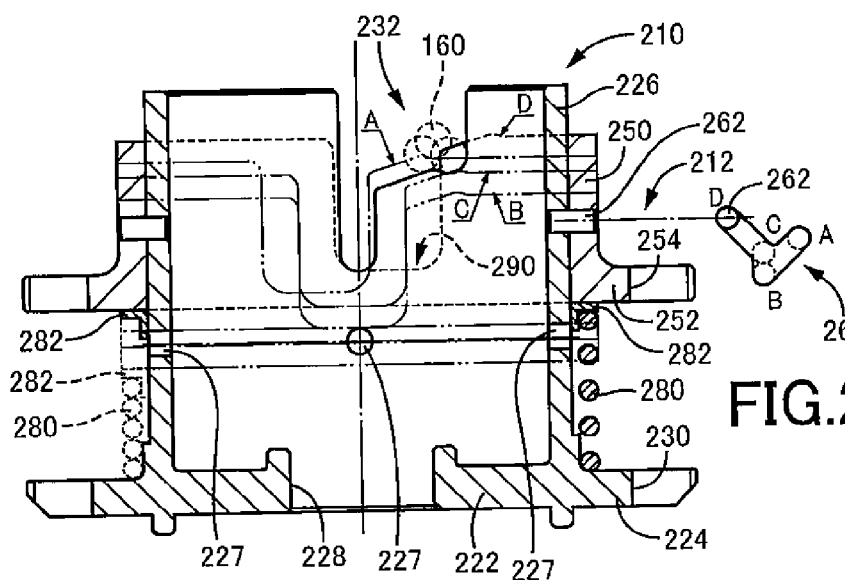
FIG.22C
FIG.22B

MOLDING METHOD AND MOLD THEREFOR

CROSS-REFERENCE

This application is a divisional of U.S. patent application Ser. No. 13/090,699 (now U.S. Pat. No. 8,617,453), which claims priority to U.S. provisional patent application No. 61/325,976 filed on Apr. 20, 2010, the entire contents of which are incorporated herein by reference.

TECHNICAL FIELD

The invention relates to methods and molds for molding a synthetic resin product from a liquid mixture using a mold unit having a female mold and a male mold, which define a molding cavity therebetween when closely engaged with each other.

BACKGROUND ART

There is a long-felt need in the art for molding methods and molds capable of manufacturing high-precision products (e.g., mechanical parts, electric parts, electronic parts, or the like). The liquid mixture used for molding can be a mixture of different liquid materials, i.e., a liquid mixture, and these liquid mixtures may include high-viscosity liquid materials.

However, when a molding method is performed using a mixture of high-viscosity liquid materials, an undesirable possibility exists that minute air bubbles will be trapped in the liquid mixture during the process of mixing and agitating the liquid materials, especially in case the liquid materials are mixed and agitated without any special care.

Further, an additional possibility exists that high-viscosity liquid materials will trap ambient air while being injected into a mold, and the trapped air will end up as air bubbles entrained in the molded material. Still further, when the molding is performed using high-viscosity liquid materials, the inner surface of a mold (that may have, e.g., very small gaps, undercuts, or the like) may not be completely filled and covered with the liquid mixture (i.e., the liquid mixture does not reach all portions of the entire inner surface of the mold), which may undesirably lead to surface imperfections on the final molded product.

It is possible to perform the degassing of the mixed material prior to injecting the mixed liquid material into the mold. However, when at least one of liquid components has a high viscosity, air bubbles can become undesirably entrained in the liquid mixture if the liquid mixture is degassed without any special care.

In any event, if air bubbles are contained in the liquid mixture in the mold or if the inner surface of the mold is not completely filled with the liquid mixture, then the final molded product will have defects. That is, the molded product will contain air bubbles (i.e., voids) within the interior of the final molded product or on the surface thereof.

For these reasons, there has been the need in the art to agitate the liquid mixture while effectively degassing the liquid mixture. One known technique comprises using a mixer to agitate and degas the liquid mixture by placing the liquid mixture in a container and then simultaneously rotating and orbiting the container under a vacuum (for example, see Japanese Patent Application Publication No. H11-104404).

SUMMARY

The agitating/degassing technique disclosed in JP H11-104404 may allow the liquid mixture to be effectively degassed before the liquid mixture is injected into a mold for molding, without any bubbles being entrained in the liquid mixture.

However, an undesirable possibility still exists that, when the liquid mixture is being injected into the mold for molding after it has been agitated/degassed, the liquid mixture will trap ambient air, and the trapped air will form air bubbles in the liquid mixture held in the mold. In addition or in the alternative, the molding process could undesirably proceed with the inner surface of the mold not completely filled and coated with the liquid mixture.

For these reasons, the above-described known technique does not adequately eliminate or minimize the risk that the final molded product will contain air bubbles within the interior of the product or on the surface thereof.

Therefore, in one aspect of the present teachings, a method of molding a synthetic resin product from a liquid mixture using a mold unit having a selectively engageable female mold and a male mold is disclosed. In certain aspects of the present teachings, the final product may be molded with greater ease, without air bubbles being trapped in the final product, and/or without damage to portions of the surface of the final product.

According to another aspect of the present teachings, a method is provided for molding a synthetic resin product from a liquid mixture using a mold unit. The mold unit preferably includes a female mold and a male mold, which are closely engaged with each other in a selective manner to define a cavity having a desired shape, and are disengaged from each other. The method preferably comprises:

filling the cavity with the liquid mixture;

simultaneously agitating and degassing the liquid mixture within the cavity by disposing at least the female mold of the mold unit in a mixer while the cavity is filled with the liquid mixture, and by orbiting at least the female mold under a vacuum around an orbital axis while rotating at least the female mold about a rotational axis that is eccentric to the orbital axis; and curing the liquid mixture in the mold unit.

Advantageous objects and effects, such as noted above, may be achieved according to any one of the following modes of the present teachings. These modes will now be summarized and each mode will be given a number. One mode may depend from and include all steps of a preceding mode, as indicated. This organization is intended to facilitate a better understanding of at least some of the plurality of technical features and the plurality of combinations thereof disclosed in this specification, and is not intended to imply that the scope of these features and combinations should be interpreted to limit the scope of the following modes of the present teachings. That is to say, it should be understood that the technical features, which are stated in this specification but which are not stated in the following modes, may also be selected as technical features of a claimed invention.

Furthermore, although some of the selected modes will be recited in a dependent form so as to depend from the other mode(s), it does not exclude the possibility that technical features currently recited in the dependent-form mode may become independent of those in the corresponding dependent mode(s) and/or may be removed therefrom. It should be understood that the technical features in the dependent-form mode(s) may become independent according to the nature of the corresponding technical features, where appropriate.

(1) A method of molding a synthetic resin product from a liquid mixture using a mold unit having a female mold and a male mold, which are closely engaged with each other in a selective manner to define a cavity having a desired shape, and are disengaged from each other, the method comprising:

filling the cavity with the liquid mixture;

simultaneously agitating and degassing the liquid mixture within the cavity, by disposing at least the female mold of the mold unit, with the cavity filled with the liquid mixture, in a mixer, and by orbiting at least the female mold under a vacuum around an orbital axis while rotating at least the female mold about a rotational axis that is eccentric to the orbital axis; and curing the liquid mixture in the mold unit.

According this molding method, at least the female mold of the mold unit can be orbited around the orbital axis under a vacuum, while the cavity is filled with the liquid mixture, while also being rotated about the rotational axis that is eccentric to the orbital axis. As a result, the liquid mixture is simultaneously agitated and degassed within the cavity of the mold unit in an effective manner.

Further, according to this molding method, at least the female mold is subjected to the combined motion (planetary motion) of the rotation and the orbiting by the mixer while the cavity is filled with the liquid mixture, to thereby facilitate the filling or coating of the entire surface of at least the female mold with the liquid mixture.

For these reasons, according to this molding method, it is easier to mold a final product without air bubbles being trapped in the final product or without damage to portions of the surface of the final product.

(2) The molding method according to mode (1), wherein the curing includes heating the entire mold unit, to thereby cure the liquid mixture within the cavity.

(3) The molding method according to mode (1) or (2), wherein the filling is performed when the female mold is not closely engaged with the male mold, to fill the female mold with the liquid mixture, the agitating/degassing includes:

a primary or preliminary agitating/degassing sub-step of: disposing the female mold, which has been filled with the liquid mixture in the filling step, in the mixer with the female mold not closely engaged with the male mold, and orbiting the entire female mold around the orbital axis under a vacuum using the mixer while rotating the entire female mold about the rotational axis, to thereby simultaneously agitate and degas the liquid mixture within the female mold;

after performing the primary/preliminary agitating/degassing sub-step, performing an assembling sub-step of attaching the male mold to the female mold, to thereby assemble the mold unit; and a main or subsequent agitating/degassing sub-step of simultaneously orbiting and rotating the entire assembled mold unit using the mixer, to thereby repeat the simultaneous agitating and degassing of the liquid mixture within the cavity in the mold unit.

According to the molding method of this aspect of the present teachings, prior to agitating/degassing the liquid mixture using the mixer with the female mold closely engaged with the male mold in the mold unit, the liquid mixture within the female mold is first agitated/degassed by the same mixer as the above-mentioned mixer or by a separate one. When the female mold is not in close engagement with the male mold, the material contained therein has a higher fluidity because the liquid mixture has a larger space in which it can flow than when the female mold is in close engagement with the male mold. As a result, the liquid mixture can be more efficiently and effectively agitated/degassed when the liquid mixture is agitated/degassed with the female mold not closely engaged with the male mold.

Therefore, according to this aspect of the present teachings, the liquid mixture can be agitate/degassed with higher efficiency than if the primary/preliminary agitating/degassing were to be omitted.

Incidentally, because the female mold forms the exterior surface of a molded product, it is possible that the exterior surface of a final molded product will have defects if the female mold is not adequately filled, coated or covered with the liquid mixture prior to the curing/hardening of the liquid mixture.

However, according to the molding method according to this aspect, the liquid mixture can be agitated within the female mold, not only by the main/subsequent agitating/degassing, but also by the primary/preliminary agitating/degassing that precedes the main agitating/degassing, to thereby facilitate an adequate filling, coating or covering of the entire surface of the female mold with the liquid mixture. As a result, the possibility is eliminated or at least substantially minimized that an inadequate filling of the female mold with the liquid mixture will cause defects to the exterior surface of the final molded product.

(4) The molding method according to mode (1) or (2), wherein the agitating/degassing includes:

performing an assembling sub-step of attaching the male mold to the female mold, which has been filled with the liquid mixture in the filling step, such that the male mold and the female mold are spaced apart from each other while being movable towards each other, to thereby assemble the mold unit;

disposing the assembled mold unit in the mixer;

performing a preventing sub-step of preventing the centrifugal force generated by the orbiting motion from forcing (allowing) the female mold and the male mold to move towards each other, which would bring the male mold into close engagement with the female mold, during a mold-closing prevention period that starts when the mixer initiates operation, and during which the male mold and the female mold are prevented from being brought into close engagement with each other;

performing a first agitating/degassing sub-step of agitating and degassing the liquid mixture within the female mold using the mixer during the mold-closing prevention period while the male mold is spaced apart from the female mold;

performing a permitting sub-step of permitting the centrifugal force generated by the orbiting to force (allow) the female mold and the male mold to move towards each other, thereby bringing the male mold into close engagement with the female mold, during a mold-closing permission period that follows the mold-closing prevention period, while the mixer is operating, and during which the male mold and the female mold are permitted to be brought into close engagement with each other; and performing a subsequent agitating/degassing sub-step of agitating and degassing the liquid mixture within the cavity of the mold unit using the mixer during the mold-closing permission period, while the male mold is in close engagement with the female mold.

According to the molding method of this aspect of the present teachings, it is possible for first and second stages to be performed during a continuous period in which a composite motion of rotation and orbiting is imparted to the mold unit using the mixer. In the first stage, the liquid mixture exhibits a high fluidity, because it is being agitated/degassed within the female mold that is not in close engagement with the male mold. In the second stage, the liquid mixture is agitated/degassed within the female mold that is in close engagement with the male mold. Thus, during the first stage, only the female mold is filled with the liquid mixture while the agitating/degassing of the liquid mixture is performed, whereas in the second stage the female mold and the male mold are filled with the liquid mixture while the agitating/degassing of the liquid mixture is performed.

Therefore, according to the molding method of this aspect, the mixer is not required to be operated in two discontinuous periods for the agitating/degassing of the liquid mixture and the filling with the liquid mixture, resulting in an improved efficiency in the molding operation.

(5) The molding method according to mode (4), wherein the female mold and the male mold are supported so as to be movable relative to each other in the direction of a common axis, and so as to be rotatable relative to each other about the axis, in order to perform the prevention sub-step and the permission sub-step, the mold unit is configured in order to perform the prevention sub-step and the permission sub-step so as to include:

a first member that moves integrally with the male mold; and a second member that moves integrally with the female mold, the first and second members are rotatable and axially movable relative to each other, and have a closest relative axial-position to each other that varies between a prevention position, in which the male mold is prevented from being brought into close engagement with the female mold, and a permission position, in which the male mold is permitted to be brought into close engagement with the female mold, depending on the relative rotational-position of the first and second members, the relative rotational-position of the first and second members varies depending on an inertial force acting on the male mold in the rotational direction of the male mold as a function of acceleration or deceleration of the rotation, and the relative axial-position of the first and second members varies depending on an axial centrifugal-force acting on the male mold as a function of an orbiting speed.

(6) The molding method according to mode (4), wherein the female mold and the male mold are supported so as to be movable relative to each other in the direction of a common axis, and so as to be rotatable relative to each other about the axis, in order to perform the prevention sub-step and the permission sub-step, the mold unit is configured in order to perform the prevention sub-step and the permission sub-step so as to include:

a first member that moves integrally with the male mold; and a second member that moves integrally with the female mold, the first and second members are rotatable and axially movable relative to each other, and have a closest relative axial-position to each other that varies between a prevention position, in which the male mold is prevented from being brought into close engagement with the female mold, and a permission position, in which the male mold is permitted to be brought into close engagement with the female mold, depending on the relative rotational-position of the first and second members, the mold unit further includes:

a movable member that is movable in the direction of an axis and is rotatable about the axis relative to the female mold;

an elastic member exerting an elastic force onto the movable member in an opposite direction to the direction in which a first axial centrifugal-force acts on the movable member as a function of an orbiting speed, wherein when it moves in the opposite direction it moves away from the female mold; and an engagement portion that moves integrally with the movable member, which is selectively engaged with a predetermined at least one of the first and second members, wherein a relative axial-position of the movable member and the female mold varies depending on an axial resultant-force of the first axis centrifugal-force and the elastic force, a relative rotational-position of the movable member of the female mold varies depending on a rotational force, which is a partial force generated by decomposing the axial resultant force using a first slanted surface formed on at least one of the second member and the movable member, a relative rotational-position of the first and second members varies depending on a rotational force, which is a partial force generated by decomposing a second axial centrifugal-force using a second slanted surface formed on at least one of the first and second members, the second axial centrifugal-force acting on the first member and the male mold as a function of the orbiting speed, and a relative axial-position of the first and second members varies depending on a behavior of the engagement portion and the second axial centrifugal-force.

(7) A mold unit comprising:

a female mold and a male mold, which are closely engagable with each other in a selective manner to define a cavity having a desired shape, and are disengagable from each other, wherein the female and male molds are supported so as to be movable relative to each other in the direction of a common axis, and so as to be rotatable relative to each other about the axis;

a first member that moves integrally with the male mold; and a second member that moves integrally with the female mold, wherein the first and second members are rotatably and axially movable relative to each other, and have a closest relative axial-position to each other that varies between a prevention position, in which the male mold is prevented from being brought into close engagement with the female mold, and a permission position, in which the male mold is permitted to be brought into close engagement with the female mold, depending on a relative rotational-position of the first and second members, the relative rotational-position of the first and second members varies depending on an inertial force acting on the male mold in the rotational direction of the male mold as a function of acceleration or deceleration of the rotation, and the relative axial-position of the first and second members varies depending on an axial centrifugal-force acting on the male mold as a function of an orbiting speed, to thereby allow the male mold to selectively take positions, in which the male mold is selectively prevented from being brought into close engagement with the female mold and is permitted to be brought into close engagement with the female mold.

(8) A mold unit comprising:

a female mold and a male mold, which are closely engagable with each other in a selective manner to define a cavity having a desired shape, and are disengagable from each other, wherein the female and male molds are supported so as to be movable relative to each other in a direction of a common axis, and so as to be rotatable relative to each other about the axis;

a first member that moves integrally with the male mold; and a second member that moves integrally with the female mold, wherein the first and second members are rotatably and axially movable relative to each other, and have a closest relative axial-position to each other that varies between a prevention position, in which the male mold is prevented from being brought into close engagement with the female mold, and a permission position, in which the male mold is permitted to be brought into close engagement with the female mold, depending on a relative rotational-position of the first and second members, the mold unit further includes:

a movable member that is movable in a direction of an axis and is rotatable about the axis relative to the female mold;

an elastic member exerting an elastic force onto the movable member in an opposite direction to a direction in which a first axial centrifugal-force acts on the movable member as a function of an orbiting speed, wherein, as it moves in the opposite direction, it moves away from the female mold; and an engagement portion that moves integrally with the movable member, and which is selectively engaged with a predetermined at least one of the first and second members, a relative axial-position of the movable member and the female mold varies depending on an axial resultant-force of the first axis centrifugal-force and the elastic force, a relative rotational-position of the movable member of the female mold varies depending on a rotational force, which is a partial force generated by decomposing the axial resultant force using a first slanted surface formed on at least one of the second member and the movable member, a relative rotational-position of the first and second members varies depending on a rotational force, which is a partial force generated by decomposing a second axial centrifugal-force using a second slanted surface formed in at least one of the first and second members, the second axial centrifugal-force acting on the first member and the male mold as a function of an orbiting speed, and a relative axial-position of the first and second members varies depending on a behavior of the engagement portion and the second axial centrifugal-force.

BRIEF DESCRIPTION OF THE DRAWINGS

FIG. 11A is a perspective view illustrating a portion of the sealing method depicted in FIG. 9 in a time series, and FIG. 11B is a perspective view illustrating another portion of the sealing method in a time series.

FIG. 21 is a process flowchart illustrating an agitating/degassing process of the cap molding method according to the third embodiment.

FIG. 22A is a plan view illustrating a guide cup and a movable member of a mold unit for use in performing a cap molding method according to a fourth embodiment of the present teachings, FIG. 22B is a side sectional view illustrating the guide cup and the movable member, and FIG. 22C is a front view illustrating a second guide groove of the mold unit.

DETAILED DESCRIPTION OF THE INVENTION

Some presently-preferred embodiments of the invention will be described in the following in more detail with reference to the drawings.

Figure 1:
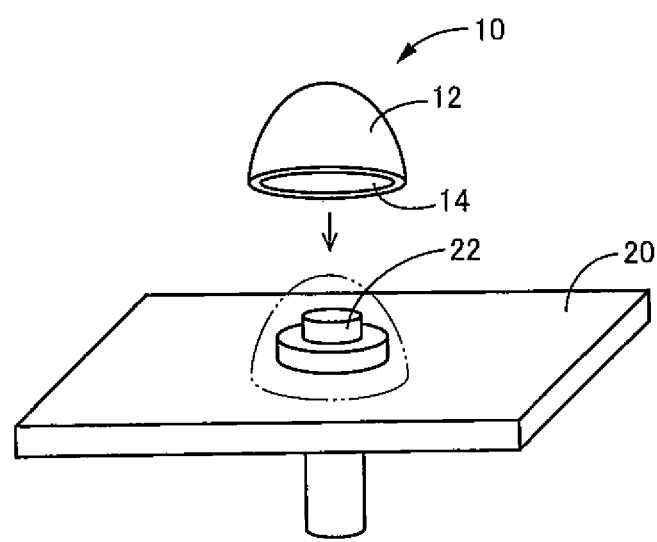
FIG. 1 is a perspective view illustrating a cap to be molded by a cap molding method according to a first embodiment of the present teachings, along with the intended application of the cap after molding.

FIG. 1 illustrates in a perspective view a cap 10 as a molded product to be molded using the cap molding method according to a first embodiment of the present teachings.

The cap 10 is made of synthetic resin and includes a shell 12 that forms a generally hemispherical, hollow shape. The shell 12 includes an outer surface and an inner surface, which both form a generally hemispherical shape, thereby defining a recess (hollow portion) 14, which forms a generally hemispherical shape, within the shell 12.

The cap 10 will be attached to a fastener, with which a fastened member is fastened, for the purpose of enclosing or covering an outside surface of at least a portion of the fastener, to thereby protect at least a portion of the fastener that would otherwise be exposed.

In the example illustrated in FIG. 1, the fastened member is a panel member 20 made of synthetic resin, and the fastener is a bolt (alternatively, a screw, a nut or a rivet) 22, with which the panel member 20 is fastened. In the example illustrated in FIG. 1, the cap 10 is attached to the bolt 22 in order to cover the outside surface of the exposed portion of the bolt 22 that projects from the surface of the panel member 20.

In addition, when attached to the bolt 22, the cap 10 provides a substantially air-tight seal with the bolt 22. For providing the seal, the cap 10 is filled with a sealant prior to the attachment, and the sealant brings the cap 10 and the bolt 22 into air-tight contact with each other. The air-tight contact prevents ingress of foreign matter (i.e., gases, liquids or solids) between the cap 10 and the portion of the bolt 22 that is enclosed by the cap 10. The adhesion and/or air-tightness of the sealant prevent undesired removal of the cap 10 from the bolt 22.

The sealant is made of a synthetic resin which, in the present embodiment, is the same as that of the cap 10. Although the reason will be explained in further detail below, the commonly-used material for making the sealant and the cap 10 is a high-viscosity material and exhibits thermosetting properties, such that the liquid mixture cures when heated above a prescribed temperature (e.g., 50° C.), and once cured, the original properties of the liquid mixture will not be restored even if the temperature decreases. In addition, the liquid mixture also exhibits the property that, when the liquid mixture is cooled below a prescribed temperature (e.g., −20° C.) prior to curing and is thus frozen, the chemical reaction (curing) in the liquid mixture stops, and thereafter, when the liquid mixture is heated and thawed, the chemical reaction (curing) in the liquid mixture restarts.

In the present embodiment, the liquid mixture that may be used in both the sealant and the cap 10 is a two-part type that is prepared by mixing two solutions, i.e., "Solution A" (curing agent) and "Solution B" (major component). A representative, non-limiting example of "Solution A" is PR-1776 B-2, Part A (i.e., an accelerator component that is a manganese dioxide dispersion) sold by PRC-DeSoto International, U.S.A.; a representative, non-limiting example of "Solution B," which is combined with Solution A, is PR-1776 B-2, Part B (i.e., a base component that is a filled modified polysulfide resin) also sold by PRC-DeSoto International, U.S.A.

Figure 2:
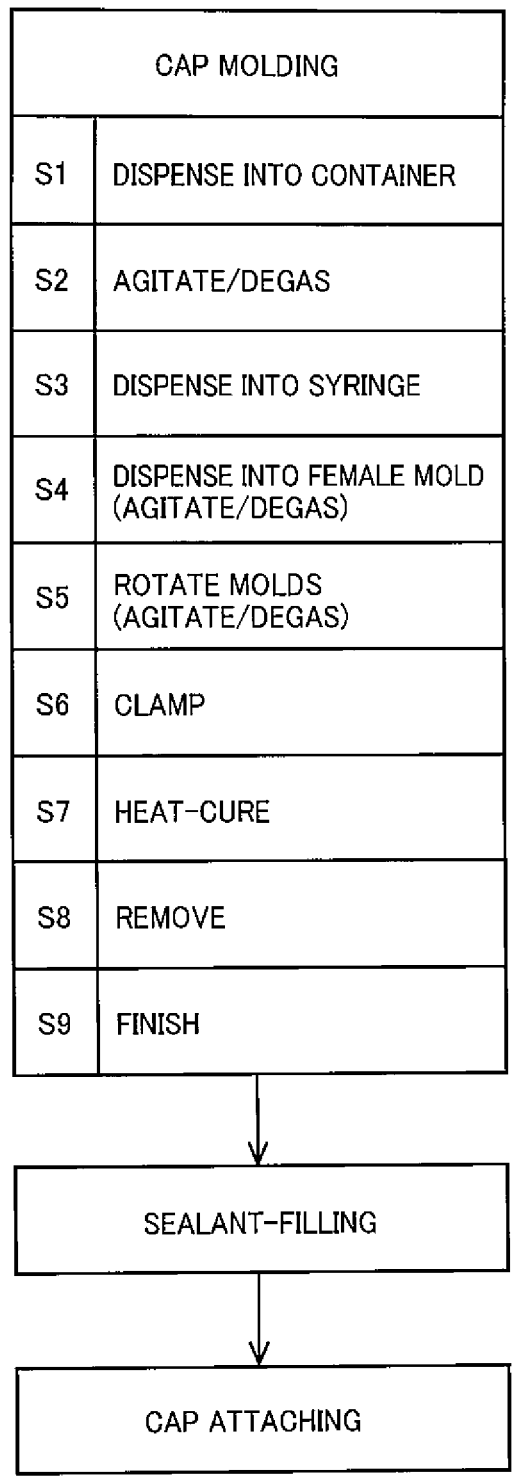
FIG. 2 is a process flowchart illustrating the details of the cap molding method, inclusive of additional steps to be performed subsequent to the cap molding method.

In FIG. 2 the cap molding method according to the present embodiment is illustrated in a process flowchart. This method is performed at the location for manufacturing the cap 10. Although this method will be further described below, after the cap 10 has been molded using this method, a filling process is performed to fill the recess 14 of the cap 10 with the sealant prior to shipping the thus-molded cap 10, e.g., to the customer (i.e. prior to transporting the cap 10 to a worksite where the cap 10 will be attached to the bolt 22).

Subsequently, a cap attaching process is performed at the worksite, wherein the cap 10 is filled with the sealant at the worksite and the cap 10 is attached to the bolt 22. In an alternative described in further detail below, the sealant may instead be filled into the cap 10 prior to shipping to the worksite.

The cap molding method according to the present embodiment will now be described in further detail with reference to FIG. 2.

As illustrated in FIG. 2, this method begins at the manufacturing location of the cap 10 with step S1 in which, as illustrated in FIG. 3A, the aforementioned Solutions A and B are dispensed into a container 30 in a predetermined mixing ratio (e.g., 1:10). These two solutions are mixed in the container 10, resulting in a liquid mixture that is an exemplary material for molding the cap 10 in the present embodiment, and is also an exemplary material, from which the sealant is made.

Figure 4:
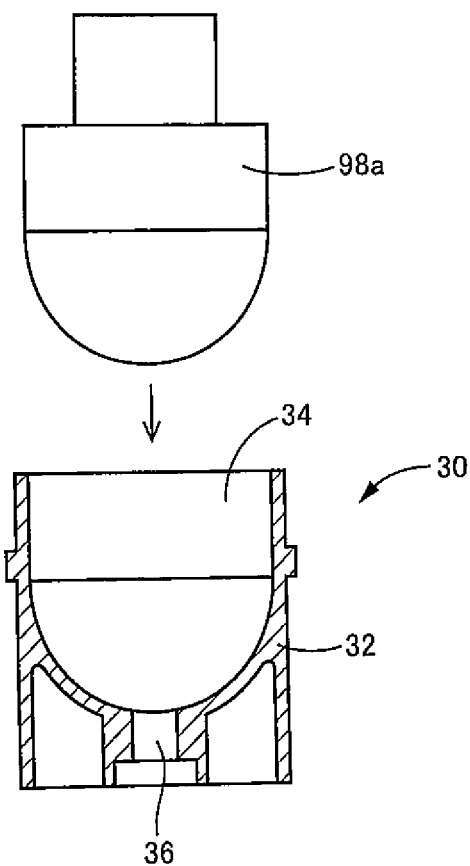
FIG. 4 is a cross-sectional view illustrating a container and a pusher.

FIG. 4 illustrates the container 30 in a vertical cross-sectional view. The container 30 is configured to include an axially-extending hollow case 32, and a chamber 34 formed within the case 32 in the shape of a coaxially-formed hollow cylinder having one end closed. The bottom section of the chamber 34 has a recess that forms a generally hemispherical shape. By having a bottom section with a recess that forms a hemispherical-shape, the liquid mixture in the chamber 34 can flow more smoothly than if the bottom section were to be flat, thereby improving the mixing efficiency of the liquid mixture.

A discharge passage 36 is formed in the bottom section of the chamber 34 for discharging the liquid mixture (i.e., the mixture of Solutions A and B), which has been dispensed into the chamber 34, after completing the agitating/degassing of the liquid mixture, and the discharge passage 36 is closed with a detachable plug (not shown) in a selective manner. The dispensing of the liquid mixture into the container 30 is performed while the discharge passage 36 is closed or sealed by the plug.

Figure 3:
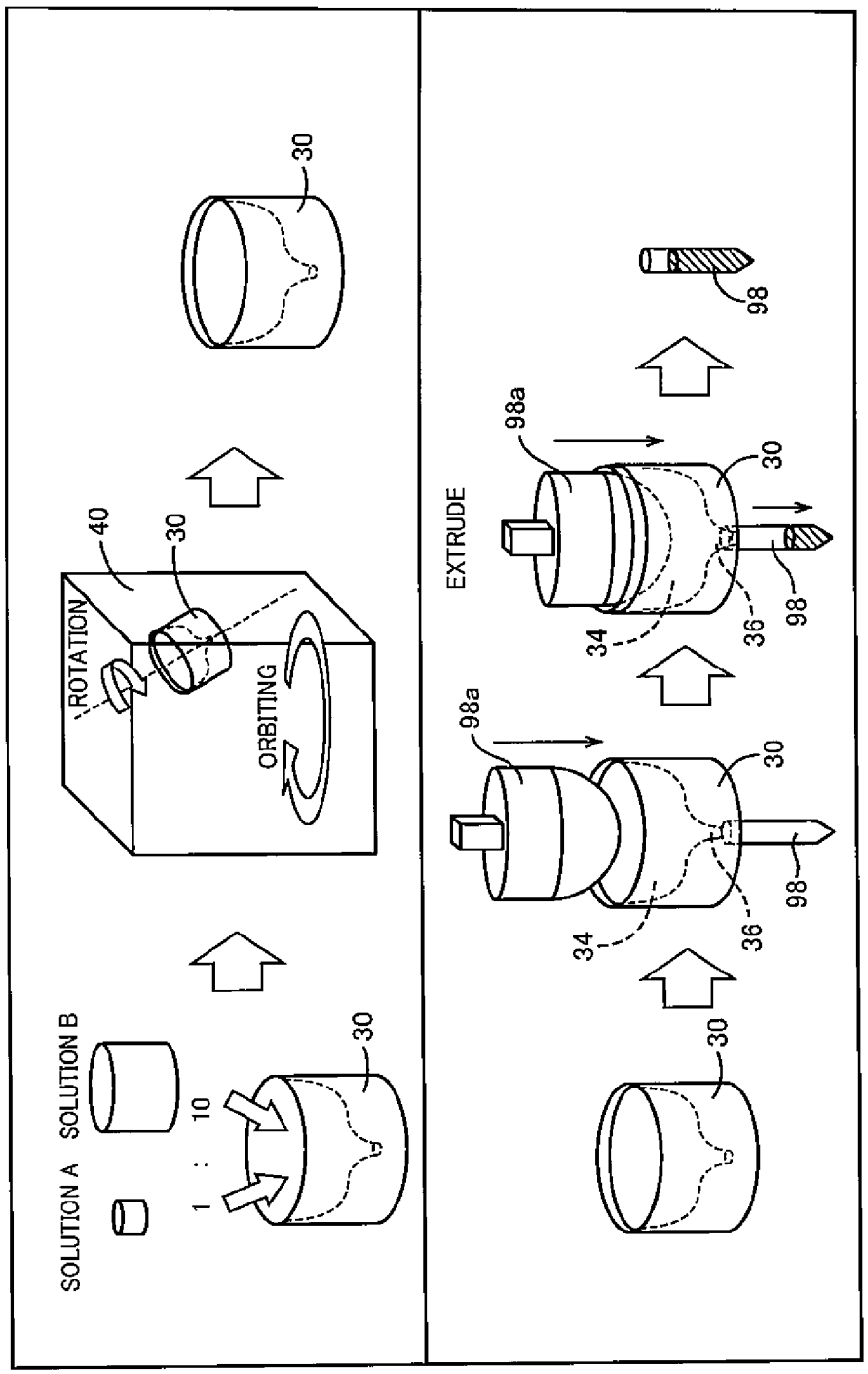
FIG. 3A is a perspective view illustrating a portion of the cap molding method depicted in FIG. 2 in a time series.
FIG. 3B is a perspective view illustrating another portion of the cap molding method in a time series.

As illustrated in FIG. 2, the container 30 containing the liquid mixture is then subjected in step S2 to a planetary motion (i.e., the composite motion of the rotation and the orbiting) as is illustrated in FIG. 3, to thereby agitate (mix) the liquid mixture while degassing it. In the present embodiment, the rotational axis of the container 30 is tilted relative to the orbital axis of the container 30.

A mixer 40 is used for performing the agitating/degassing process in step S2. The mixer 40 imparts a centrifugal force to the liquid mixture under vacuum, to thereby agitate the liquid mixture while degassing it. The agitating/degassing process is performed at a predetermined temperature (e.g., about 20° C. to about 30° C.) and at a predetermined humidity (e.g., 50% RH), which conditions depend upon the curing/hardening properties of the liquid mixture. These same conditions may also be used in the following steps. In step S2, the container 30 is subjected to a relatively weak (closer to atmospheric pressure) vacuum pressure (e.g., 40 kPa).

Figure 5:
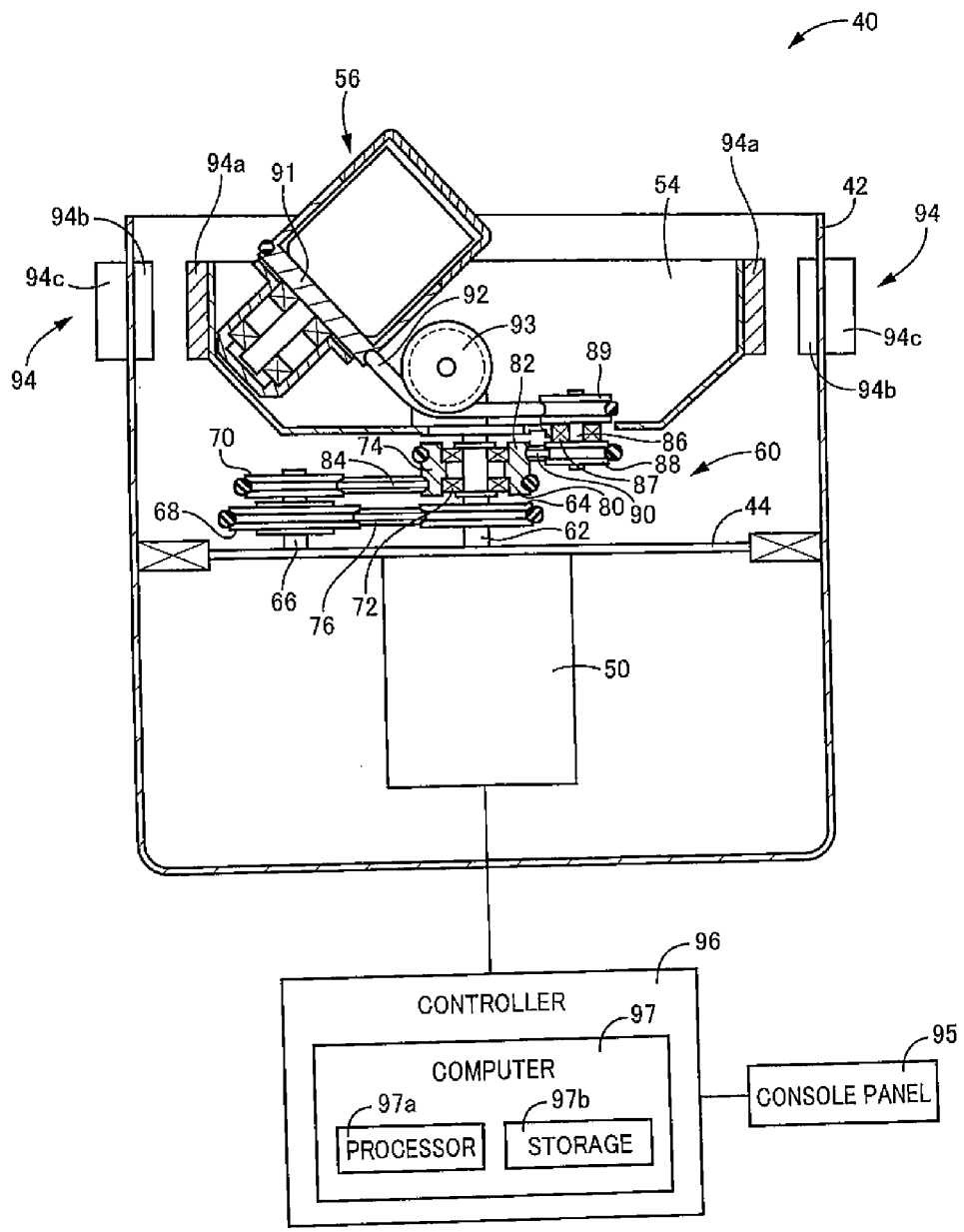
FIG. 5 is a cross-sectional view illustrating the mixer depicted in FIG. 3.

FIG. 5 illustrates an example of the mixer 40 in a partial cross-sectional side view.

The mixer 40 includes a housing 42 having a hollow structure with a bottom (e.g., a hollow cylinder shape) and a lid (not shown) detachably attached to an opening end of the housing 42, so that it has an opening end that is closable or sealable in a substantially air-tight manner. Within the housing 42, a base frame 44 that is elastically suspended on the housing 42 is disposed so as to absorb possible vibrations.

A motor 50 is mounted on the base frame 44. A rotatable frame 54 having a hollow cylinder shape is coupled to the motor 50. The rotatable frame 54 is rotated about the orbital axis by the motor 50.

The rotational axis is defined in the rotatable frame 54 at a position eccentric to the orbital axis, and in an orientation in which the rotational axis is inclined relative to the orbital axis (e.g., at 45 degrees). The rotational axis is rotated together with the rotatable frame 54.

The container holder 56 is mounted on the rotatable frame 54 so as to be coaxial with the rotational axis and so as to be rotatable about the rotational axis. The container holder 56 is used to hold the container 30, or to hold a mold unit as will be described below. The container holder 56 is rotated about the rotational axis by the motor 50.

In the present embodiment, the motor 50 is directly coupled to the rotatable frame 54, while the motor 50 is indirectly coupled to the container holder 56 via a power transmission system 60 (e.g., a belt driven system, a chain driven system, a gear driven system, etc.).

In the example illustrated in FIG. 5, the power transmission system 60 includes: a first rotatable shaft 62 rotated by the motor 50, a first pulley 64 (a pulley is an example of a rotor) that is coaxially affixed to the first rotatable shaft 62, and a second rotatable shaft 66. The second rotatable shaft 66 is rotatably mounted on the base frame 44 so as to be positioned eccentric to and oriented parallel to the first rotatable shaft 62.

The power transmission system 60 further includes a second pulley 68 and a third pulley 70, which are coaxially affixed to the second rotatable shaft 66, and a rotor 74. The rotor 74 is coaxially attached to the first rotatable shaft 62 via a bearing 72, so as to be rotatable relative to the first rotatable shaft 62. A first belt 76 (a belt is an example of an endless transmission) is wound around the first pulley 64 and the second pulley 68. A fourth pulley 80 and a fifth pulley 82 are integrally formed on the rotor 74. A second belt 84 is wound around the third pulley 70 and the fourth pulley 80.

The power transmission system 60 still further includes a third rotatable shaft 86 that is positioned eccentric to and oriented parallel to the orbital axis. The third rotatable shaft 86 revolves together with the rotatable frame 54, while being rotated relative to the rotatable frame 54 via the bearing 87. The power transmission system 60 still further includes a sixth pulley 88 and a seventh pulley 89, each of which is coaxially affixed to the third rotatable shaft 86, and a third belt 90 that is wound around the fifth pulley 82 and the sixth pulley 88.

The power transmission system 60 further includes: an eighth pulley 91 that is rotated coaxially and integrally with the container holder 56, a fourth belt 92 that is wound around the eighth pulley 91 and the seventh pulley 89, and a pair of guide pulleys 93 (in a plan view) that guide (re-direct) a pair of straight portions (in a plan view) of the fourth belt 92 so as to bend the pair of straight portions.

In the present embodiment, the orbiting and the rotation of the container holder 56 are produced by the common motor 50; the orbiting and rotation of the container holder 56 kinetically depend on each other. Further, in the present embodiment, the ratio between the orbiting speed and the rotational speed of the container holder 56 is fixed.

In an exemplary modified version of the mixer 40, while the orbiting and the rotation of the container holder 56 are produced by the common motor 50, a clutch or a CVT (Continuous Velocity Transmission) may be utilized to allow the ratio between the orbiting speed and the rotational speed to vary. In another exemplary modified version, the orbiting and the rotation of the container holder 56 are produced by separate motors, respectively, to thereby allow the orbiting speed and the rotational speed of the container holder 56 to be independent of each other and to be pre-set separately.

As illustrated in FIG. 5, the mixer 40 is configured to further include a brake 94, a console panel 95 and a controller 96.

The brake 94 is configured and disposed so as to rapidly decelerate at least the rotational speed (from among the rotational speed and the orbiting speed) of the container holder 56. Although not limited thereto, the brake 94 of the present embodiment may be configured to enable an external force to be exerted onto a movable component (e.g., the rotatable frame 54) by friction, wherein the movable component rotates or linearly moves with the container holder 56.

As illustrated in FIG. 5, the example of the brake 94 includes a ring-shaped band 94a attached to an outer circumferential surface of the rotatable frame 54, and a movable pad 94b rigidly affixed to the housing 42 at at least one position that opposes the band 94a (in the example illustrated in FIG. 5, at two positions that are diametrically opposite of each other).

The brake 94 further includes a displacement mechanism 94c configured to displace the movable pad 94b from the illustrated retracted position, at which retracted position the movable pad 94b is radially spaced from the band 94a, to an active position, at which active position the movable pad 94b contacts the band 94a and generates friction between the movable pad 94b and the band 94a, and vice versa. The displacement mechanism 94c may be manually operated or automatically operated. For the displacement mechanism 94c to be automatically operated, the displacement mechanism 94c may be electrically connected with the controller 96, and an actuator (not shown) built in the displacement mechanism 94c is electrically controlled by the controller 96.

In the present embodiment, when the rotatable frame 54 is decelerated by the brake 94, the motor 50 is correspondingly decelerated. In response to the deceleration of the motor 50, the container holder 56 will also be decelerated. As a result, the brake 94 decelerates the container holder 56 in both of the rotational and orbital directions.

The console panel 95 is operated by the user to start/stop the mixer 40 and to pre-set a rotation/orbiting speed profile for controlling combined motion to be imparted to the container holder 56.

The controller 96 is electrically connected with the console panel 95 and the motor 50. The controller 96 principally comprises a computer 97; as is well-known, the computer 97 includes at least one processor 97a and storage (memory) 97b.

In response to a user's start command, the controller 96 causes the at least one processor 97a to execute one or more programs (not shown) stored in the storage 97b. As a result, the motor 50 is controlled to execute the pre-set rotational/orbiting speed profile (e.g., the profile shown by the graph in FIG. 13).

More specifically, the controller 96 drives the motor 50 to change its speed using an inverter (not shown) for Variable Voltage Variable Frequency control, in accordance with the user's settings. The motor 50 is controlled by the inverter control to execute a selected one of an acceleration mode (e.g., including a rapid acceleration mode, a gradual acceleration mode, etc.), a constant speed mode, and a deceleration mode, to thereby allow each of the rotational speed and the orbiting speed of the container holder 56 to have a desired acceleration gradient and a desired deceleration gradient.

Figure 13:
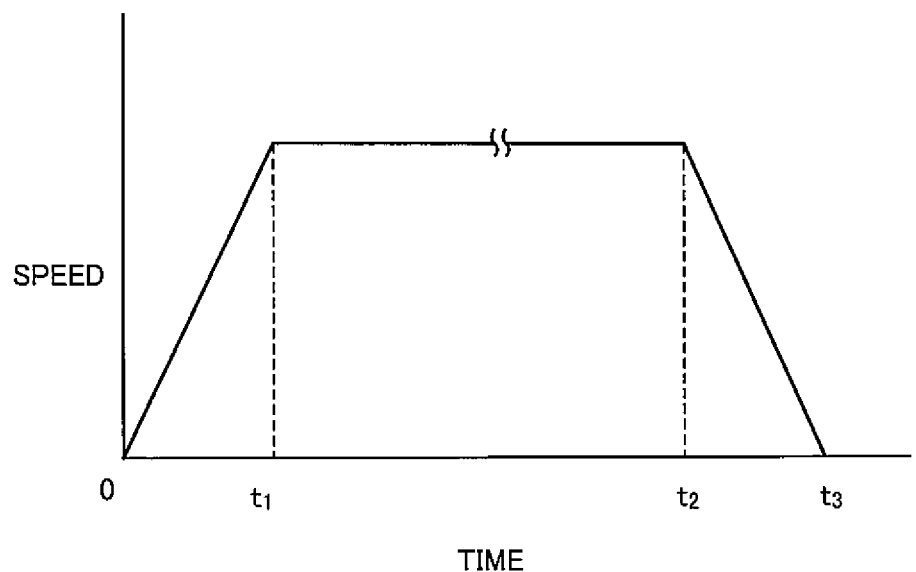
FIG. 13 is a graph for conceptually explaining the speed control for the mixer depicted in FIG. 3.

In the example illustrated in FIG. 13, the rotational speed and the orbiting speed of the container holder 56 vary with time, such that they are different in magnitude, but are similar in profile. In an alternative thereto, the rotational speed and the orbiting speed may vary with time to implement respective speed profiles that are not similar.

As illustrated in FIG. 3A, the container 30 holding the liquid mixture is placed into the container holder 56, and then the mixer 40 is activated. In operation, the interior of the housing 42 of the mixer 40 is set to a sub-atmospheric pressure (i.e. a negative pressure or a partial vacuum). A vacuum (suction) pump (not shown) is in fluid communication with the interior of the mixer 40 so as to draw or suction out the air within the housing 42. Due to the fluid communication between the interior of the container holder 56 and the interior of the housing 42, the vacuum pump also suctions air from within the container holder 56.

The liquid mixture is agitated due to the centrifugal force generated by the planetary motion, which is produced by the mixer 40. Consequently, air bubbles trapped or entrained in the liquid mixture are released from the liquid mixture due to the synergistic effect of the centrifugal force imparted by the mixer 40 and the negative pressure (partial vacuum) created by the suction pump, thereby resulting in the degassing of the liquid mixture.

After the agitating/degassing of the liquid mixture is finished, the container 30 is removed from the mixer 40, as illustrated in FIG. 3A.

Next, as illustrated in FIG. 2, the liquid mixture is dispensed into syringes 98 (i.e. smaller containers that divide the entire liquid mixture within the container 30 into smaller amounts) in step S3. More specifically, in step S3, the liquid mixture is discharged from the container 30 in individual doses, as illustrated in FIG. 3B, each discharged individual dose of the liquid mixture being dispensed into one syringe 98. Ultimately, the entire amount of the liquid mixture stored in the same container 30 is divided into a plurality of syringes 98.

As illustrated in FIG. 3B, the syringe 98 has a hollow cylinder shape with a tip end (e.g., a tapered end) having a smaller-diameter opening and a base end having a larger-diameter opening. The tip end is the smaller-diameter end, while the base end is the larger-diameter end. The syringe 98 is used such that, after a prescribed amount of the liquid mixture is dispensed into the syringe 98, the prescribed amount of material is discharged from the tip end of the syringe 98 in a conventional manner, e.g., by using positive pressure or gravity.

In the present embodiment, a pusher 98a is pushed into the chamber 34 of the container 30 in order to forcibly discharge the liquid mixture from the container 30, as illustrated in FIG. 3B. The pusher 98a has an exterior shape that is complementary to the interior shape of the chamber 34 (e.g., an exterior shape having a protrusion that forms a generally hemispherical shape). As the pusher 98a moves towards the discharge passage 36 within the chamber 34, the liquid mixture is extruded/discharged from the discharge passage 36.

In the present embodiment, while transferring the liquid mixture from the container 30 to the syringe 98, the container 30 is held in space, as illustrated in FIG. 3B, with the chamber 34 facing upward and the discharge passage 36 facing downward. In this orientation, the pusher 98a is moved downwardly within the chamber 34. As a result, the liquid mixture is downwardly extruded from the chamber 34.

Further, in the present embodiment, while transferring the liquid mixture from the container 30 to the syringe 98, the syringe 98 is held in space with the base end facing upward and the top end facing downward. In this orientation, the liquid mixture, which has been downwardly extruded from the container 30, is injected (transferred) into the syringe 98 via its base end.

Thereafter, the liquid mixture moves downwardly within the syringe 98 while displacing air within the syringe 98 and discharging the air from the opening of the tip end of the syringe 98. Because the tip end has a smaller diameter opening than the base end, the discharge of air will be impeded due to the smaller flow-through cross-section. As a result of the transfer of liquid mixture into the syringe 98, the liquid mixture will increasingly accumulate in the syringe 98, such that the uppermost level of the liquid mixture rises in the direction extending from the tip end towards the base end of the syringe 98.

In the present embodiment, step S3 is performed at atmospheric pressure; however, if it is alternatively performed at a sub-atmospheric pressure (i.e. a partial vacuum), then it becomes possible to more reliably prevent air bubbles from being trapped in the liquid mixture while it is being dispensed into the syringe 98.

Subsequently, as illustrated in FIG. 2, the liquid mixture is dispensed into a cavity 110 of the mold unit 100 in step S4.

FIG. 6 illustrates an example of the mold unit 100 in a perspective view. The mold unit 100 includes a female mold 102 and a male mold 104 that can be spaced or disposed relatively close to each other. In the present embodiment, the female mold 102 acts as a stationary mold defining a recess 110, while the male mold 104 acts as a movable mold having a protrusion that will be inserted into the recess 110 of the female mold 102. The female mold 102 imparts the desired shape to the exterior surface of the cap 10, while the male mold 104 imparts the desired shape to the interior surface of the cap 10.

Both of the female mold 102 and the male mold 104 are made of a synthetic resin, e.g., a self-lubricating synthetic resin, more preferably PTFE (Teflon®).

The female mold 102 and the male mold 104 have a common centerline, along which the male mold 104 is linearly movable relative to the female mold 102. In the present embodiment, a plurality of parallel metal guide rods 112 are detachably affixed to the female mold 102 for achieving and guiding the linear movement. A plurality of through-holes are formed in the male mold 104 in a complimentary manner, so that the guide rods 112 can slidably fit into the through-holes.

Figure 6A:
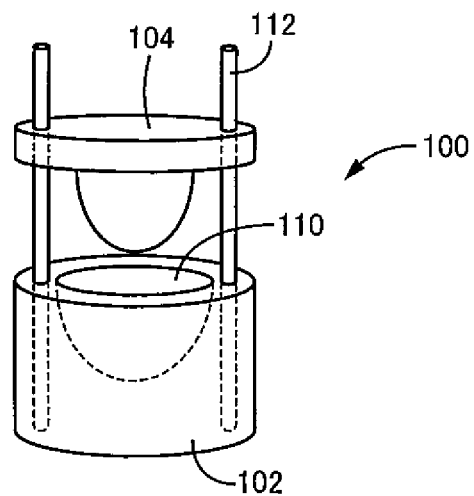
FIG. 6A is a perspective view illustrating the mold unit depicted in FIG. 3 in a mold open position.
Figure 6B:
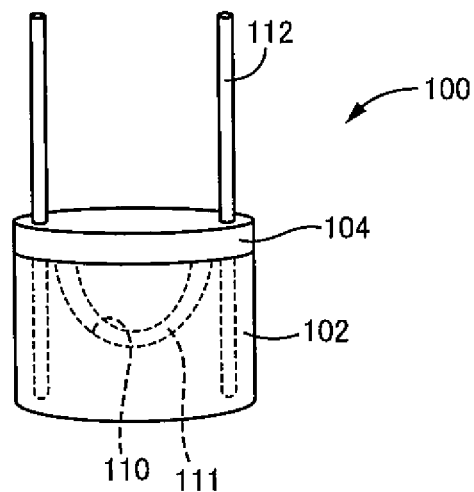
FIG. 6B is a perspective view illustrating the mold unit depicted in a mold closed position.

FIG. 6A illustrates the female mold 102 and the male mold 104 in a first position (i.e., a mold open position) in which the male mold 104 is spaced from the female mold 102, which allows the liquid mixture to be dispensed into the recess 110 of the female mold 102. FIG. 6B illustrates the female mold 102 and the male mold 104 in a second position (i.e., a mold closed position) in which the male mold 104 is closely engaged with the female mold 102, to thereby define a space between the female and male molds 102 and 104, that is a cavity 111. This cavity 111 defines the final shape of the cap 10.

Figure 7:
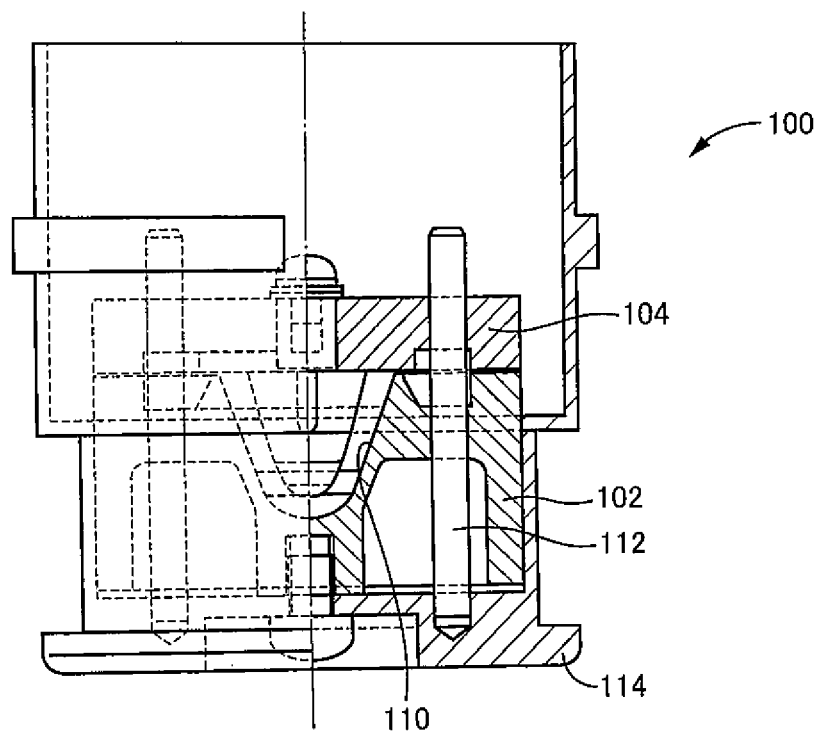
FIG. 7 is a cutaway cross-sectional view illustrating the mold unit depicted in FIG. 3.

FIG. 7 is a side view illustrating the mold unit 100 in the mold closed position. The mold unit 100 includes a case 114 having a hollow cylinder shape, which receives the female mold 102 in its bottom end. The case 114 has an exterior shape that fits into the container holder 56 of the mixer 40 without any wasteful gaps and accommodates the case 114 in the container holder 56 without any noticeable play during operation of the mixer 40.

In step S4 illustrated in FIG. 2, the liquid mixture is extruded from the syringe 98 in order to dispense it into the recess 110 of the female mold 102, as illustrated in FIG. 8A.

In addition, in step S4, the female mold 102 (with the guide rods 112 removed from the female mold 102) is received in the container holder 56 of the mixer 40, along with the case 114, as illustrated in FIG. 8A. In this state, the mixer 40 is operated with the female mold 102 disposed in a partial vacuum. As a result, the liquid mixture that has been dispensed into the recess 110 of the female mold 102 is agitated/degassed. The surface of the liquid mixture, with which the female mold 102 has been filled, is thereby flattened (i.e., smoothed). Thereafter, the female mold 102 is removed from the mixer 40 as illustrated in FIG. 8A.

In step S4, the container holder 56 is subjected to a stronger partial vacuum (e.g., 20 kPa) than in the above-described step S2.

Incidentally, the stronger the vacuum (negative pressure) on the liquid mixture, the better the degassing effect of the liquid mixture is. Moreover, the larger the volume of the liquid mixture, the greater the fluidity of the liquid mixture is; as a result of this property, the liquid mixture is easily heated by friction during the agitating/degassing of the liquid mixture under centrifugal force. On the other hand, the higher the temperature of the liquid mixture, the more easily the liquid mixture generates foam (air bubbles). Consequently, in an environment that easily generates foam, the stronger the vacuum, the more foaming is promoted in the liquid mixture.

With this in mind, when the liquid mixture is agitated/degassed within the container 30 in step S2, the liquid mixture is more easily heated because of its larger volume than that of the liquid mixture when it is agitated/degassed in step S4 within the female mold 102. As a result, the liquid mixture is more prone to generating foam (air bubble) in step S2 than in step S4.

Therefore, in the present embodiment, the agitating/degassing in step S2 is performed at a weaker partial vacuum than that the partial vacuum applied during the agitating/degassing in step S4. For the same reasons, the agitating/degassing in step S5 is performed at a stronger partial vacuum than the partial vacuum applied during the agitating/degassing in step S2. In addition, the agitating/degassing in step S5 is performed at the same partial vacuum pressure as is applied during the agitating/degassing in step S4.

Subsequently, in step S5 depicted in FIG. 2, the cap 10 is manufactured using the mold unit 100 by rotational molding.

More specifically, as illustrated in FIG. 8A, the guide rods 112 and the male mold 104 are attached to the female mold 102 that has been filled with the agitated/degassed material, and the case 114 is attached to these components. As a result, the mold unit 100 is assembled. Thereafter, in the mold open position, the mold unit 100 is entirely disposed in the container holder 56 of the mixer 40 and the mixer 40 is activated.

When the mixer 40 is activated, the male mold 104 is not closely engaged with the female mold 102, so that the fluidity of the liquid mixture within the female mold 102 is not substantially obstructed by the male mold 104. During this period (when the male mold 104 is not close to the female mold 102), the liquid mixture is agitated/degassed efficiently. The agitating/degassing is also performed at a relatively strong partial vacuum (e.g., 20 kPa, as described above), i.e., at a lower pressure than in step S2.

During the period in which the rotational speed and/or the orbiting speed of the mixer 40 increase(s) up to a target value, the centrifugal force generated by the planetary motion and applied to the male mold 104 increases as the rotational speed and/or the orbiting speed increase(s); this results in a corresponding increase in the driving force for moving the male mold 104 towards the female mold 102 along the guide rods 112.

When the driving force eventually overcomes the frictional resistance between the male mold 104 and the guide rods 112, the male mold 104 will move towards the female mold 102 along the guide rods 112. Eventually, the male mold 104 is brought into contact with the female mold 102. The mixer 40 continues operating even after the contact, to thereby allow the liquid mixture within the cavity 111 of the mold unit 100 to be agitated/degassed in the mold closed position as well. The agitating/degassing is performed at a relatively strong partial vacuum (e.g., 20 kPa, as described above), similar to the above-described previous agitating/degassing.

In the present embodiment, the male mold 104 is prevented from being brought into contact with the female mold 102 during an initial period of the molding process in order to maximize the fluidity of the liquid mixture in the female mold 102 during this time period, thereby maximizing the effect of the agitating/degassing. When a prescribed period of time has elapsed thereafter, the male mold 104 is then allowed or enabled to be brought into contact with the female mold 102.

Once the rotational molding using the mold unit 100 has been completed, the entire mold unit 100 is removed from the mixer 40. At this time, the mold unit 100 is in the mold closed position, as illustrated in FIG. 8B.

Thereafter, the mold unit 100 is clamped in step S6 depicted in FIG. 2. More specifically, the female mold 102 and the male mold 104 are tightly closed and clamped using a clamping tool (not shown). This reliably prevents the female mold 102 and the male mold 104 from detaching from each other in an undesirable manner in the subsequent heat-curing step.

Subsequently, in step S7 depicted in FIG. 2, a heat-curing process is performed. More specifically, the entire mold unit 100 may be moved into a high temperature room (e.g., between about 40° C. and about 60° C., which depends upon the curing/hardening properties of the liquid mixture), to thereby heat-cure the liquid mixture within the cavity 111 of the mold unit 100.

Thereafter, in step S8 depicted in FIG. 2, the male mold 104 is moved away from the female mold 102 to allow the cap 10 to be removed from the mold unit 100 as the completed product. That is, the mold unit 100 is dissembled.

Subsequently, in step S9 depicted in FIG. 2, the cap 10 is finished by removing undesirable burrs, etc. With that, the manufacturing process of the cap 10 is completed.

It is noted that, in step S4 in the present embodiment, the female mold 102 filled with the liquid mixture is subjected to the planetary motion by the mixer 40 as illustrated in FIG. 8A, to thereby agitate/degas the liquid mixture in the female mold 102; in the subsequent step S5, the mold unit 100 filled with the liquid mixture is subjected to the planetary motion by the mixer 40, to thereby agitate/degas the liquid mixture in the mold unit 100, which means that the agitating/degassing process using the mixer 40 is performed twice.

In an alternative, the present teachings may be practiced in a mode in which the performance of step S5 is omitted, i.e. steps S6 and S7 may directly follow upon completion of step S4. Only the agitating/degassing of the liquid mixture within the female mold 102 need be performed in step S4, in case an adequate agitating/degassing effect can be achieved thereby.

Thereafter, a sealant-filling method may be performed as illustrated in FIG. 2.

Figure 9:
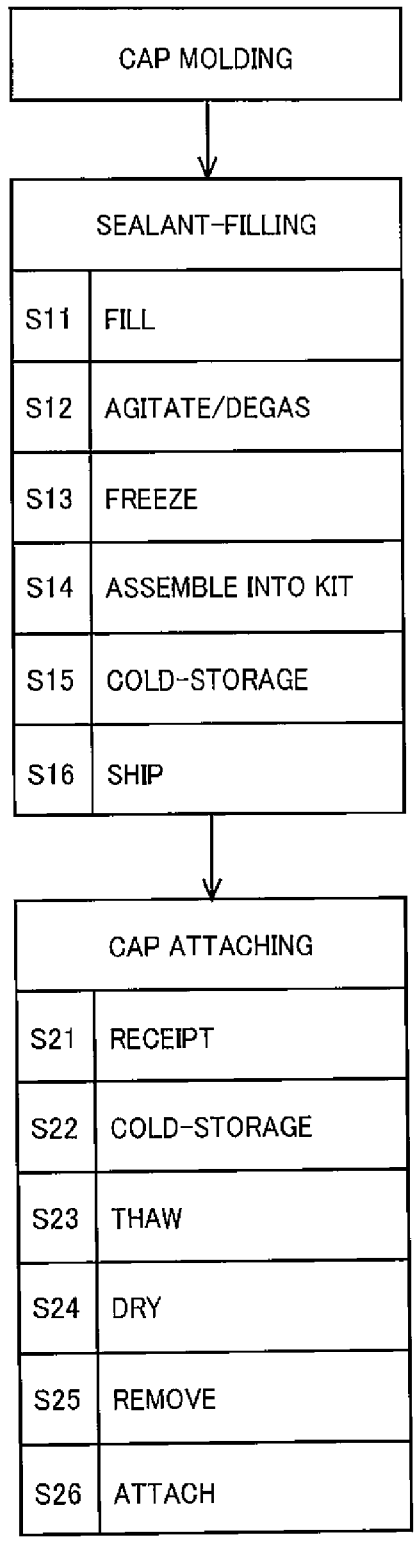
FIG. 9 is a process flowchart listing representative steps of the sealing method and the cap attaching method depicted in FIG. 2.
Figures 10A, 10B, 10C:
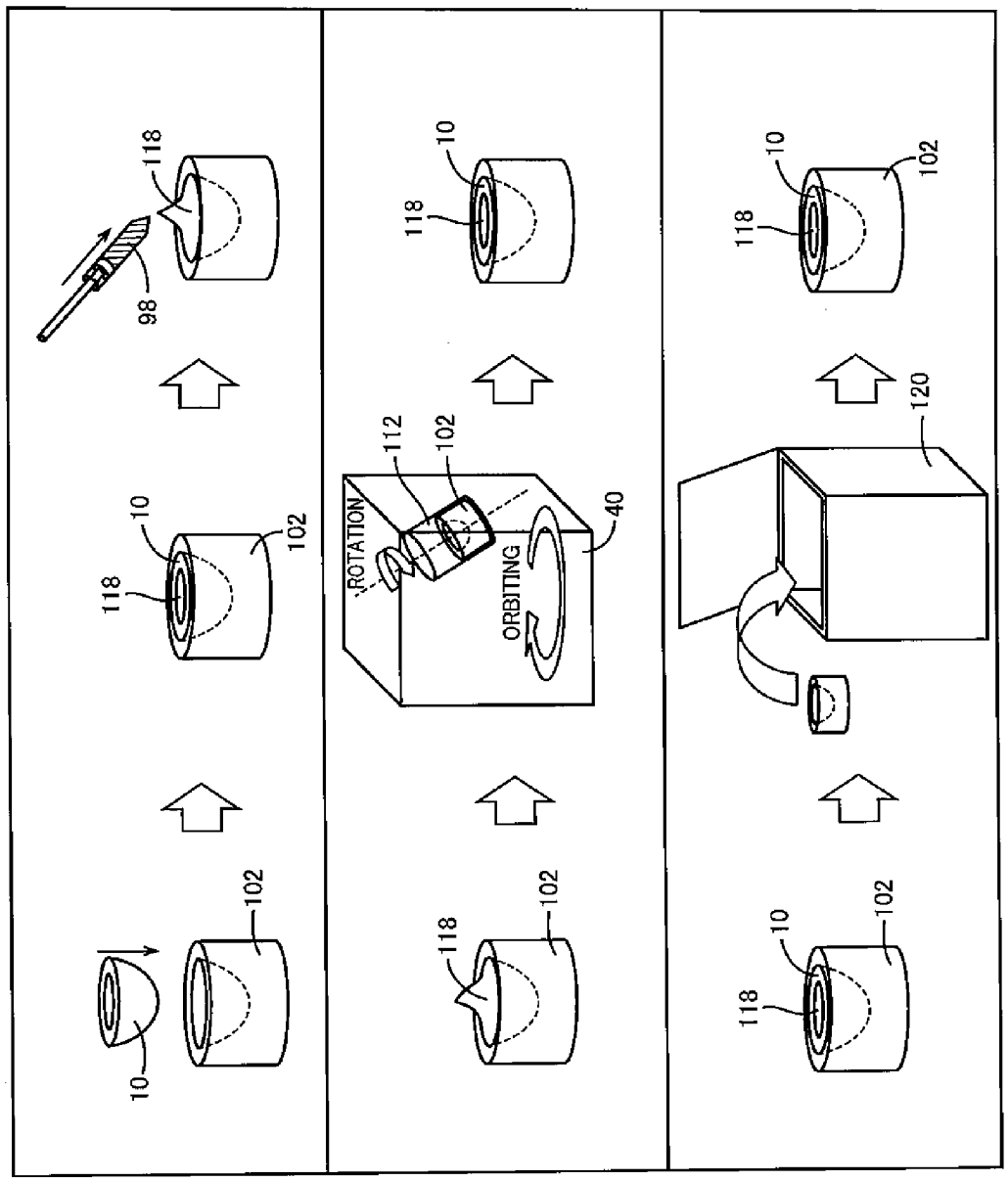
FIG. 10A is a perspective view illustrating a portion of the sealing method depicted in FIG. 9 in a time series.
FIG. 10B is a perspective view illustrating another portion of the sealing method in a time series.
FIG. 10C is a perspective view illustrating still another portion of the sealing method in a time series.

As illustrated in FIG. 9, when the sealant-filling method will be performed, the cap 10 is first loaded in step 11 as a completed product into the cavity 110 of the female mold 102 as illustrated in FIG. 10A, so that the cap 10 is held in position with the opening of the recess 14 facing upward, in preparation for filling with the sealant from above.

The use of the female mold 102 is not essential for holding the cap 10 in position. Although an alternative tool can be used, in case the female mold 102 is used, it is not necessary to manufacture an exclusive-use jig for holding the cap 10 in position.

Thereafter, with the recess 14 of the cap 10 held in position, it is filled with the sealant 118 as illustrated in FIG. 10A. The sealant 118 is extruded from the syringe 98 and is injected into the recess 14. In the present embodiment, as described above, the liquid mixture that forms the cap 10 and the sealant 118 that fills the recess 14 of the cap 10 have the same composition.

Next, in step S12 depicted in FIG. 9, the sealant 118 is agitated/degassed using the mixer 40. More specifically, the female mold 102 that has been filled with the sealant 118 is disposed in the container holder 56 of the mixer 40 as illustrated in FIG. 10B, and in this state, the mixer 40 is operated with the container holder 56 placed in a partial vacuum (e.g., at the same vacuum as steps S4 and S5). As a result, the sealant 118, which fills the recess 14 of the cap 10, is agitated/degassed. At this time, flattening (smoothing) of the surface of the sealant 118, which fills the recess 14 of the cap 10, is performed. Thereafter, the female mold 102 is removed from the mixer 40 as illustrated in FIG. 10B.

Subsequently, in step S13 depicted in FIG. 9, the sealant 118 is frozen together with the cap 10. More specifically, as illustrated in FIG. 10C, the female mold 102 holding the cap 10 is placed within a freezer 120 together with the case 114, and such that the cap 10 is filled with the sealant 118. The interior temperature of the freezer 120 is, e.g., between about −50° C. and about −70° C. The freezing time is, e.g., about 1 hour. Once the sealant 118 has been frozen (solidified or coagulated), the female mold 102 is removed from the freezer 120.

Thereafter, in step S14 depicted in FIG. 9, a plurality of product kits are manufactured. More specifically, the cap 10, which is filled with the sealant 118, is removed from the female mold 102 as illustrated in FIG. 11A, and a plurality of caps 10, each of which has been produced in the same manner as above and each of which has been filled with the frozen sealant 118, are loaded into the plurality of recesses of a pallet 122. As a result, the caps 10 are arrayed on one pallet 122, to thereby complete one product kit 124.

Subsequently, in step S15 depicted in FIG. 9, the entire product kit 124 is placed into cold-storage. More specifically, as illustrated in FIG. 11B, the product kit 124 is placed within a low-temperature room (although not shown, e.g., a constant temperature room between about −50° C. and −70° C., such as a cold room), to thereby prevent the sealant 118 within each cap 10 from unintentionally thawing during storage.

Thereafter, in step S16 depicted in FIG. 9, the caps 10, each of which has been filled with the sealant 118, are shipped to the worksite while maintaining the caps 10 in the frozen state, e.g., in the cold-storage. With that, the sealant-filling method is completed.

As a result, the manufacture of the caps 10, which serve as final products, is completed. Each cap 10 is a combination of the cap 10, which served as an intermediate product, and the frozen sealant 118, with which each cap 10 is filled.

In other words, at this point in time, each cap 10 serving as a final product is a multi-layered structure made of a solid outer layer (shell 12) and a solid inner layer that is located within the outer layer, wherein the outer layer is made of a material, the original fluidity of which cannot be restored even by subsequent thawing due to the curing having already been completed, and the inner layer is made of a material (sealant 118), the original fluidity of which can be restored by subsequent thawing due to the fact that the curing was not previously completed.

After the sealant-filling method has been completed in the manner described above, the cap attaching method, as illustrated in FIG. 9, does not start at the manufacturing location, but rather it starts at the worksite.

More specifically, in step S21, the product kit 124 is first received at the worksite. Next, in step S22, the received product kit 124 is placed into cold-storage in a freezer (not shown).

Figures 12A, 12B:
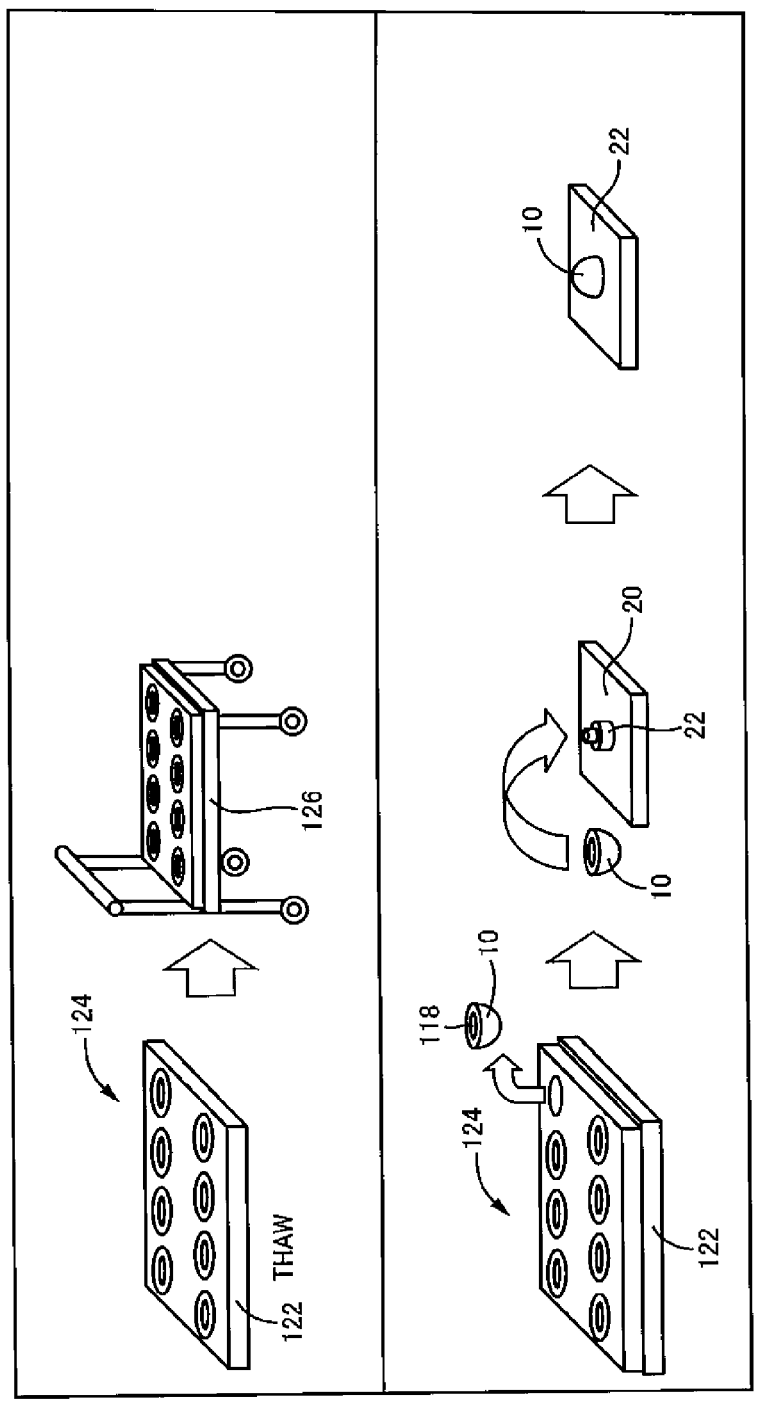
FIG. 12A is a perspective view illustrating a portion of the cap attaching method depicted in FIG. 9 in a time series.
FIG. 12B is a perspective view illustrating another portion of the cap attaching method in a time series.

Subsequently, in step S23, when it becomes necessary to initiate the cap attaching process using the product kit 124, the product kit 124 is removed from the freezer and thereafter, the product kit 124 is thawed in a thawing area (although not shown, e.g., a thawing (warm) room) as illustrated in FIG. 12A. The thawing process can be performed, for example, at room temperature, by direct heating using a heater (e.g., a hot-air-type heater having a drying function), or by indirect heating by immersing in hot water.

After the cap 10 is thawed, the shell 12 is still solid and not liquefied, while the sealant 118 is liquefied and exhibits its original fluidity.

Thereafter, in step S24 (or concurrently with the thawing of step S23), the product kit 124 is dried using a dryer (not shown), to thereby remove any condensation that has formed on the surface of the cap 10 due to the thawing. The dryer can be configured, for example, to blow air onto the cap 10 at room temperature or hot air, to thereby blow off and/or evaporate any water on the surface of the cap 10.

Subsequently, in step S25, the product kit 124 is removed from the thawing area or the drying section, and the removed product kit 124 is transported to the worksite, e.g., using a handcart 126 as illustrated in FIG. 12A. Thereafter, in step S26, as illustrated in FIG. 12B, one cap 10, which will be used now and which is filled with the sealant 118, is removed from the pallet 122 and attached to an exposed portion of the bolt 22 that projects from the surface of the panel member 20.

At this time, the cap 10 is solid while the sealant 118 within the cap 10 is fluid, which enables the cap 10 to be attached to the bolt 22. The sealant 118 deforms relatively freely so as to fill in any possible gaps between the cap 10 and the bolt 22, without leaving any gaps. As a result, a seal between the cap 10 and the bolt 22 is achieved. With that, this cap attaching method is completed.

As will be evident from the foregoing explanation, in the present embodiment, the first half of step S4 depicted in FIG. 2, which is performed to extrude the liquid mixture from the syringe 98 and fill the female mold 102 with the extruded material, constitutes one representative, non-limiting example of the "filling" set forth in the above-described mode (1). The last half of step S4 depicted in the same figure, which is performed to rotate/orbit the female mold 102 filled with the liquid mixture using the mixer 40, and step S5 depicted in the same figure together constitute one representative, non-limiting example of the "agitating/degassing" set forth in the same mode. Step S7 depicted in the same figure constitutes one representative, non-limiting example of the "curing" set forth in the same mode.

Further, in the present embodiment, the last half of step S4 depicted in FIG. 2, which is performed to rotate/orbit the female mold 102 filled with the liquid mixture using the mixer 40, constitutes one representative, non-limiting example of the "primary agitating/degassing sub-step" set forth in the aforementioned mode (3). The first half of step S5 depicted in the same figure, which is performed to assemble the mold unit 100, constitutes one representative, non-limiting example of the "assembling sub-step" set forth in the same mode. Finally, the last half of step S5 depicted in the same figure, which is performed to rotate/orbit the assembled mold unit 100 using the mixer 40, constitutes one representative, non-limiting example of the "main agitating/degassing sub-step" set forth in the same mode.

Next, a cap molding method according to a second embodiment of the present teachings will be described. The present embodiment, however, is similar to the first embodiment, except for step S3 depicted in FIG. 2. Therefore, the present embodiment will be described in detail with regard to only the elements that differ from those of the first embodiment, while a redundant description of the elements common with those of the first embodiment will be omitted.

In the first embodiment, while transferring the liquid mixture from the container 30 to the syringe 98 as illustrated in FIG. 3B, the container 30 is held in space with the chamber 34 facing upward and with the discharge passage 36 facing downwardly. In this orientation, the pusher 98a is moved downward within the chamber 34. As a result, the liquid mixture is extruded downwardly from the chamber 34.

Further, in the first embodiment, while transferring the liquid mixture from the container 30 to the syringe 98, the syringe 98 is held in space with its base end facing upward and with its tip end facing downward. In this orientation, when downwardly extruded from the container 30, the liquid mixture is injected into the syringe 98 via its base end.

Figure 14:
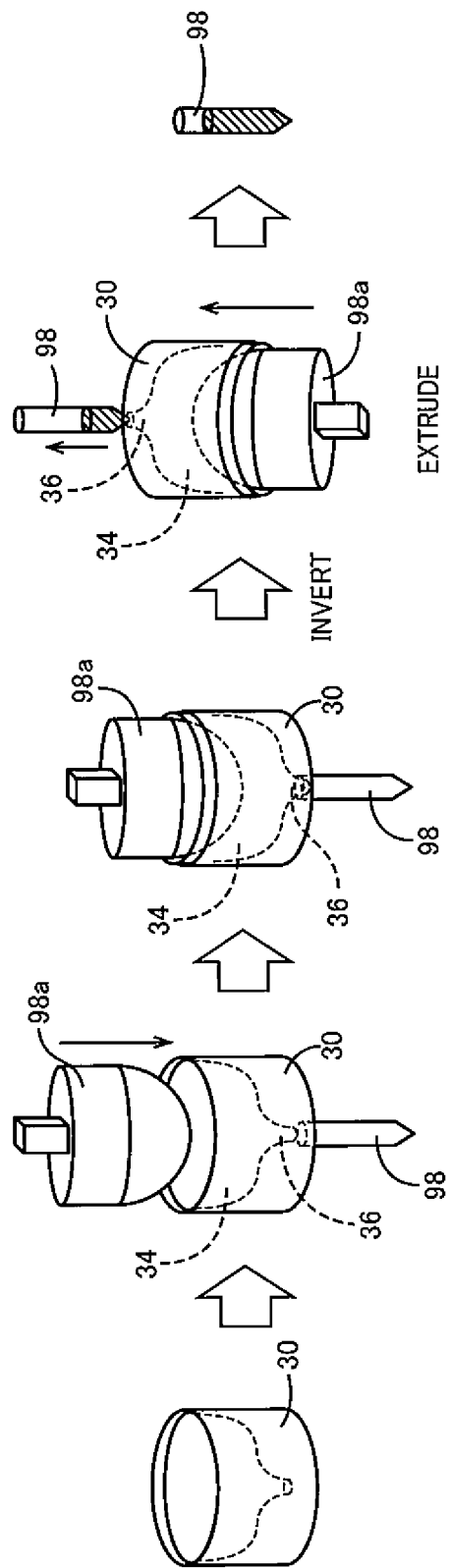
FIG. 14 is a perspective view illustrating a portion of a cap molding method according to a second embodiment of the present teachings in a time series, which second embodiment differs from the first embodiment.

In contrast, in the present embodiment as illustrated in FIG. 14, while transferring the liquid mixture from the container 30 to the syringe 98, the container 30 is first held in space, similar to the first embodiment, with the chamber 34 facing upward and with the discharge passage 36 facing downward. In this orientation, the opening of the chamber 34 is blocked or sealed by the pusher 98a. As a result, even if the container 30 is inverted, material from the container 30 will not leak from the opening of the chamber 34 due to gravity.

Thereafter, the container 30 is inverted from the original orientation, and as a result, the container 30 is held in space with the discharge passage 36 facing upward and with the chamber 34 facing downward. Subsequently, the syringe 98 is held in space with its base end facing upward with its tip end facing downward, and with the tip end and the outlet of the discharge passage 36 coinciding with each other.

In this orientation, the pusher 98a is moved upwardly within the chamber 34. As a result, the liquid mixture is extruded upwardly from the chamber 34. When upwardly extruded from the container 30, the liquid mixture is injected into the syringe 98 not via its base end, but rather via its tip end.

Thereafter, the liquid mixture moves upwardly within the syringe 98 while displacing air within the syringe 98 and discharging the air from the opening of the base end of the syringe 98 (less prone to impede the discharge of air due to the larger diameter than the opening of the tip end). As a result, the liquid mixture increasingly accumulates in the syringe 98, such that the uppermost level of the liquid mixture rises in the direction from the tip end to the base end.

Thus, in the present embodiment, when the liquid mixture is injected into the syringe 98, because it is injected via the tip end of the syringe 98, it is completed without compressing air within the syringe 98, as opposed to when it is injected from the base end. As a result, when the liquid mixture is injected into the syringe 98, it is less likely that air bubbles will be trapped in the liquid mixture within the syringe 98, than when the liquid mixture is injected via the base end of the syringe 98.

Next, a cap molding method according to a third embodiment of the present teachings will be described. The present embodiment, however, is similar to the first embodiment, except for a particular portion of the molding method, the structure of the mold unit, and the speed control for the mixer. Therefore, the present embodiment will be described in detail with regard to only the elements that differ from those of the first embodiment, while a redundant description of the elements common with those of the first embodiment will be omitted.

Figure 8:
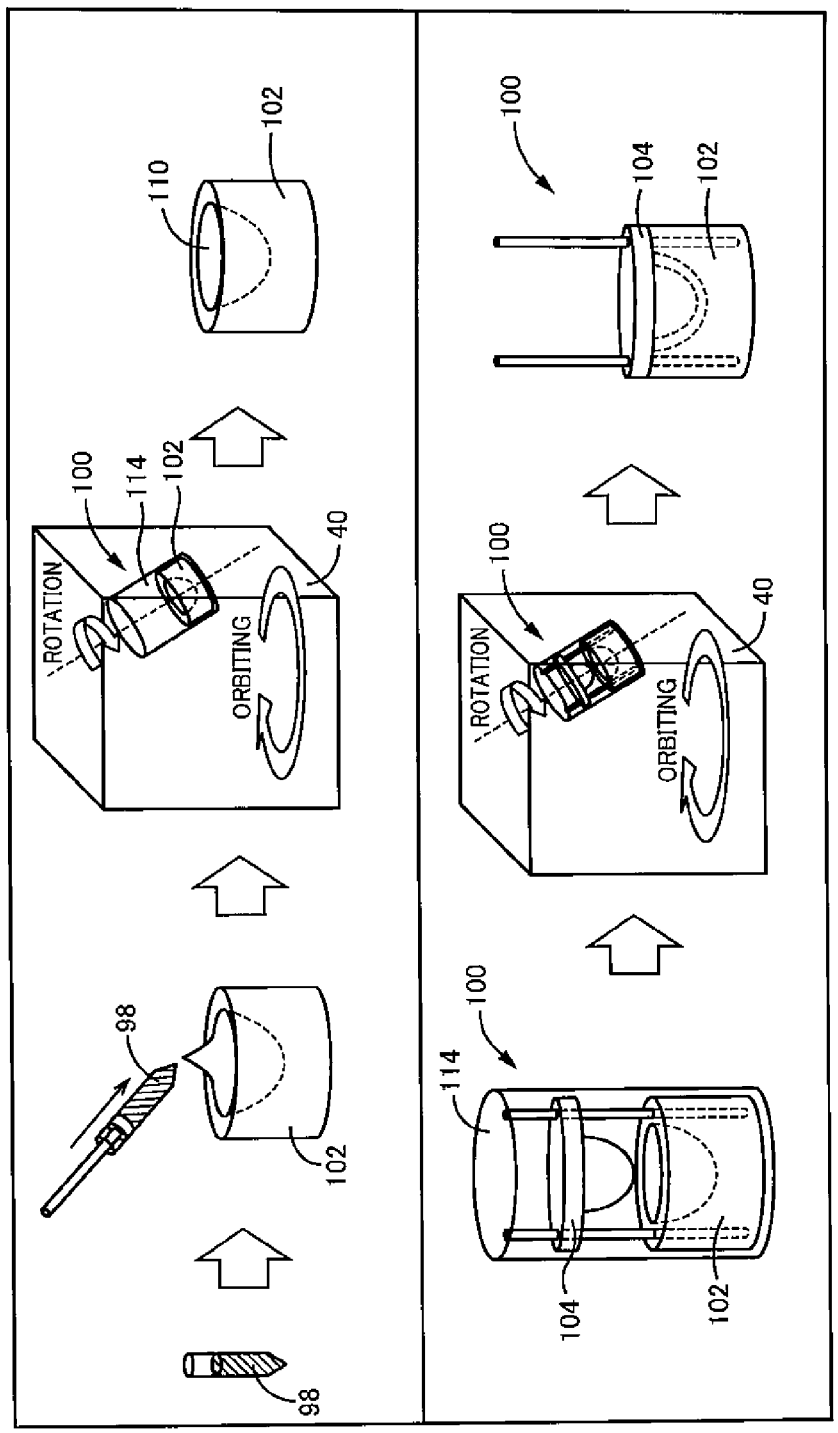
FIG. 8A is a perspective view illustrating a portion of the cap molding method depicted in FIG. 2 in a time series.
FIG. 8B is a perspective view illustrating another portion of the cap molding method in a time series.

In the first embodiment, as illustrated in FIGS. 2 and 8, only the female mold 102, which has been filled with the liquid mixture, is rotated/orbited using the mixer 40 in step S4 prior to assembling the mold unit 100, and then the mold unit 100 is assembled in step S5. The assembled mold unit 100 is then rotated/orbited using the mixer 40.

In contrast, in the present embodiment, step S4 is omitted; instead, step S5 includes a mold-closing prevention period in a first half thereof and includes a mold-closing permissible period in a last half thereof. In other words, in the present embodiment, although it will be further explained below with reference to FIG. 21, the agitating/degassing process is performed such that it has a mold-closing prevention period and a mold-closing permissible period.

During the mold-closing prevention period, while the male mold in the assembled mold unit is prevented from being closely engaged with the female mold, the liquid mixture within the female mold is agitated/degassed. In contrast, during the mold-closing permissible period, the male mold is permitted to be closely engaged with the female mold, and after the engagement, the liquid mixture is agitated/degassed within the narrow cavity defined by the male and female molds that are engaged with each other.

Figures 15A, 15B:
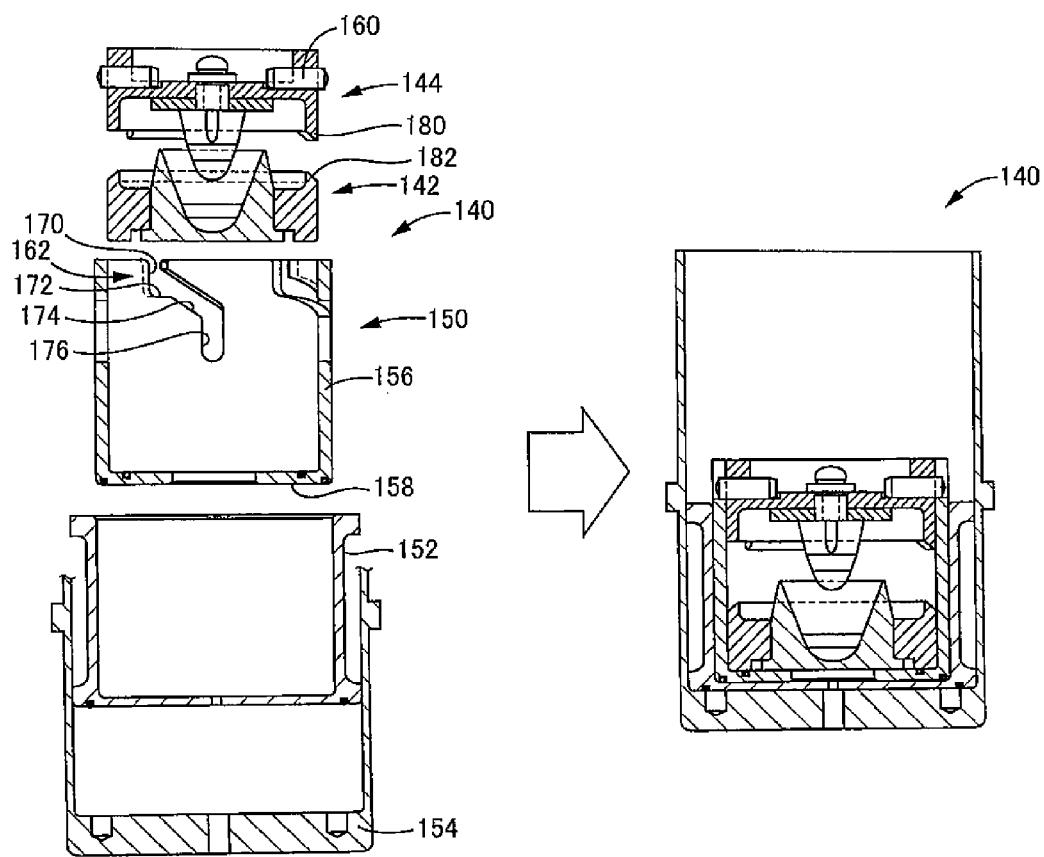
FIG. 15A is an exploded and cross-sectional view illustrating a mold unit for use in performing a cap molding method according to a third embodiment of the present teachings.
FIG. 15B is a cross-sectional view illustrating the mold unit when assembled.

FIG. 15 illustrates a mold unit 140 for use in performing the above-described agitating/degassing process in an exploded view and an assembled view, both of which are viewed from the front.

Similar to the mold unit 100 depicted in FIGS. 6 and 7, the mold unit 140 has a female mold 142 and a male mold 144, each of which has a cylindrical outer circumferential surface. The female mold 142 and the male mold 144 together define a cavity. Both of the female mold 142 and the male mold 144 are primarily comprised of POM (polyacetal), which is an example of an excellent self-lubricating engineering plastic. However, a portion of each of the female mold 142 and the male mold 144, which contact each other, is preferably made of PTFE (Teflon®).

The mold unit 140 further includes a guide cup 150 (a first cylindrical member), a spacer 152 and a mold-attachment cup 154 (a second cylindrical member having a larger diameter than the first cylindrical member).

The guide cup 150, which has a hollow cylinder shape with a bottom, includes a cylindrical section 156 and a bottom section 158 that encloses one of the two ends of the cylindrical section 156. The female mold 142 fits within the guide cup 150, contacts the bottom section 158 and is detachably attached to an inner circumferential surface of the guide cup 150, such that the female mold 142, after being attached, is rigidly affixed to the inner circumferential surface of the guide cup 150 with axial and rotational relative-movement inhibited. The guide cup 150 is made, e.g., of POM.

The spacer 152 also has a hollow cylinder shape with a bottom; the guide cup 150 slidably fits within the spacer 152 along its inner circumferential surface and is detachably attached to the inner circumferential surface of the spacer 152, such that the guide cup 150, after being attached, is rigidly affixed to the inner circumferential surface of the spacer 152 with axial and rotational relative-movement inhibited.

The mold-attachment cup 154 also has a hollow cylinder shape with a bottom; the spacer 152 slidably fits within the mold-attachment cup 154 along its inner circumferential surface and is detachably attached to the inner circumferential surface of the mold-attachment cup 154, such that the spacer 152, after being attached, is rigidly affixed to the inner circumferential surface of the mold-attachment cup 154 with axial and rotational relative-movement inhibited.

The mold-attachment cup 154 fits into the container holder 56 without any noticeable play and is detachably attached to the inner circumferential surface of the container holder 56, such that the mold-attachment cup 154, after being attached, is rigidly affixed to the inner circumferential surface of the container holder 56 with axial and rotational relative-movement inhibited.

Both the female mold 142 and the male mold 144 are fitted within the inner circumferential surface of the guide cup 150. The female mold 142 is rigidly affixed to the guide cup 150, such that the female mold 142 will always integrally rotate/orbit with the guide cup 150. In contrast, the male mold 144 fits in the guide cup 150 so as to be axially and rotatably movable relative to the guide cup 150. As a result, the male mold 144 can move axially towards and away from the female mold 142 while being guided by the inner circumferential surface of the guide cup 150. The movement of the male mold 144 relative to the female mold 142 is limited by cooperative action of guide pins and elongated guide holes that are fitted with each other, as will be described below.

Figure 16:
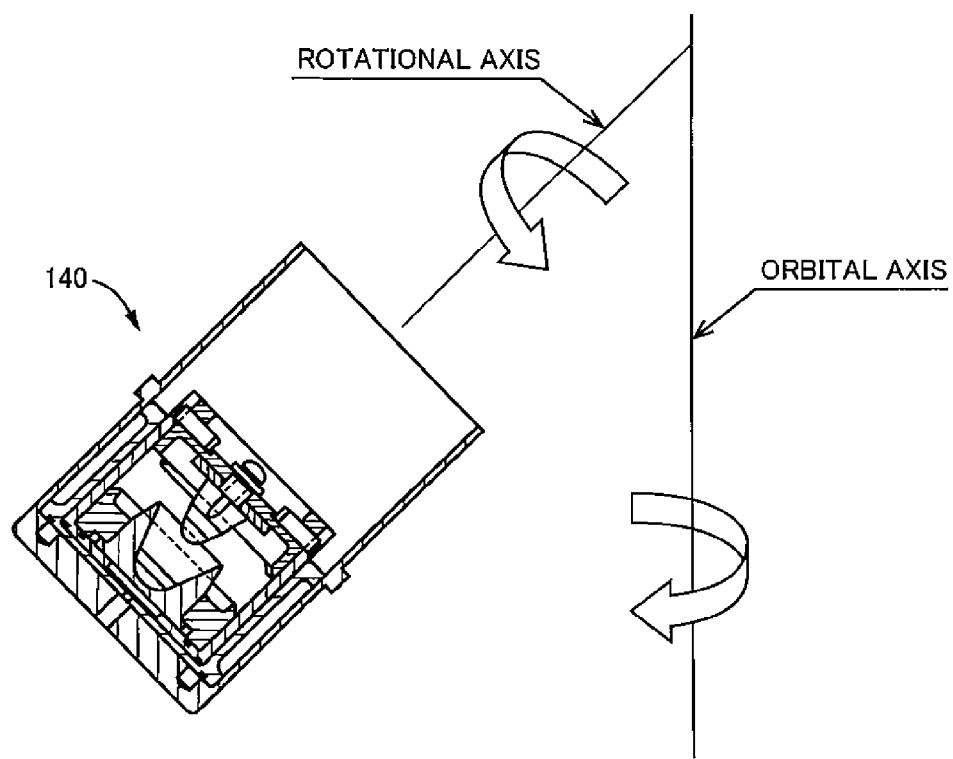
FIG. 16 is a side view for explaining the composite motion of the rotation and the orbiting imparted to the mold unit depicted in FIG. 15.

As illustrated in FIG. 16, while the mold unit 140 is orbiting about the orbital axis, it is also rotated about the rotational axis, which is positioned eccentric from the orbital axis and which is tilted relative to the orbital axis.

Figure 17:
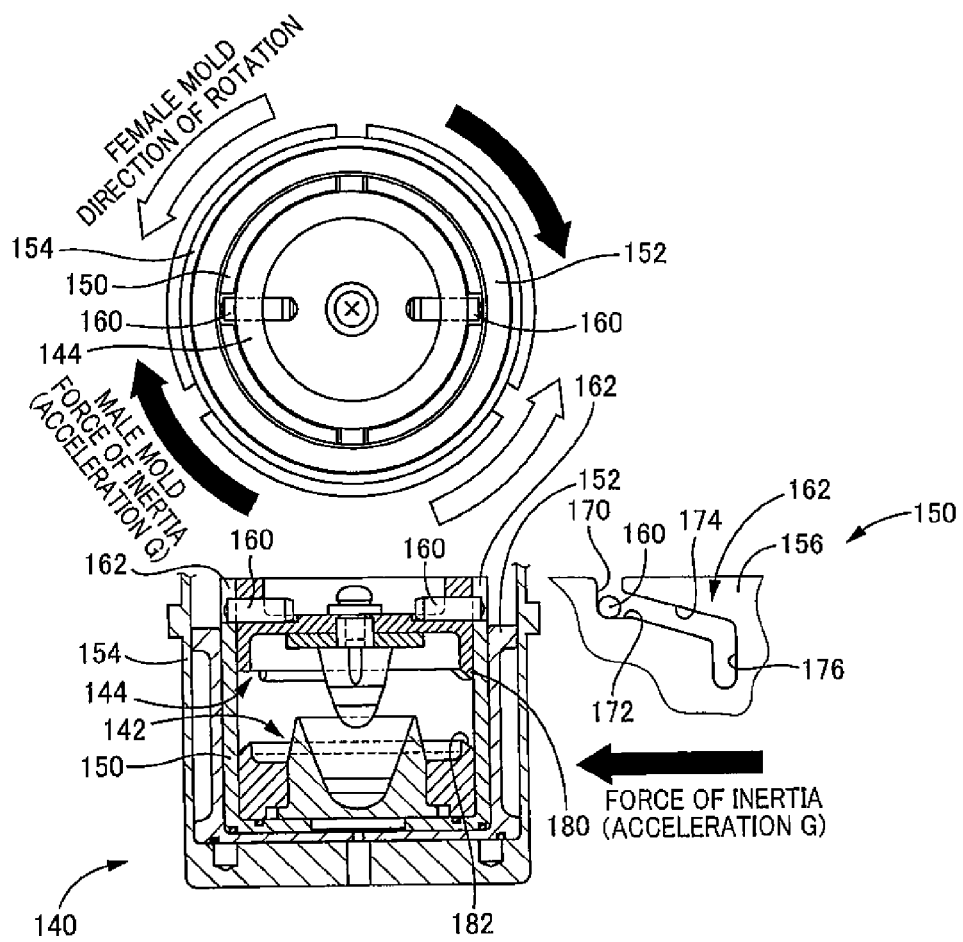
FIG. 17 is a plan view, a cross-sectional view and an enlarged cutaway view for explaining the principles of the relative motion between the female mold and the male mold of the mold unit depicted in FIG. 15.

As illustrated in FIGS. 15 and 17, a plurality of radially-extending guide pins 160 are attached to the male mold 144. In the example depicted in FIGS. 15 and 17, two guide pins 160 are aligned in a diametrically opposed manner.

As illustrated in FIG. 15, a plurality of elongated guide holes (alternatively, guide grooves) 162 are formed in the cylindrical section 156 of the guide cup 150 so as to extend from a top end of the cylindrical section 156. Each guide pin 160 is engaged with one elongated guide hole 162 so as to be movable relative to the elongated guide hole 162 along the length thereof. The width of each guide elongated hole 162 is set to be larger than the diameter of each guide pin 160.

As illustrated in FIGS. 15 and 17, each elongated guide hole 162 includes a first portion 170 extending axially (downwardly) from the top end of the cylindrical section 156, a second portion 172 extending in the circumferential direction from a terminal end of the first portion 170, a third portion 174 extending obliquely downwardly from a terminal end of the second portion 172 and a fourth portion 176 extending axially (downwardly) from a terminal end of the third portion 174.

As described above, the male mold 144 is axially and rotatably movable relative to the guide cup 150, but a path along which the male mold 144 can move is defined by the cooperative action of the guide pins 160 and the elongated guide holes 162. In addition, relative displacement (including relative rotation and relative linear motion) between the male mold 144 and the guide cup 150 generates relative movement between the male mold 144 and the female mold 142.

Briefly explained, the relative displacement between the male mold 144 and the guide cup 150 is generated based on the inertial force (primarily the direction thereof (from among the magnitude and the direction of the inertial force)) applied to the rotational direction of the male mold 144 and the axial component (magnitude) of the centrifugal force acting on the male mold 144.

While the mixer 40 is inactive, each guide pin 160 is located in its initial state at the terminal end (the lowest position) of the first portion 170 as illustrated in FIG. 17, due to gravity acting on the male mold 144.

Figure 20A:
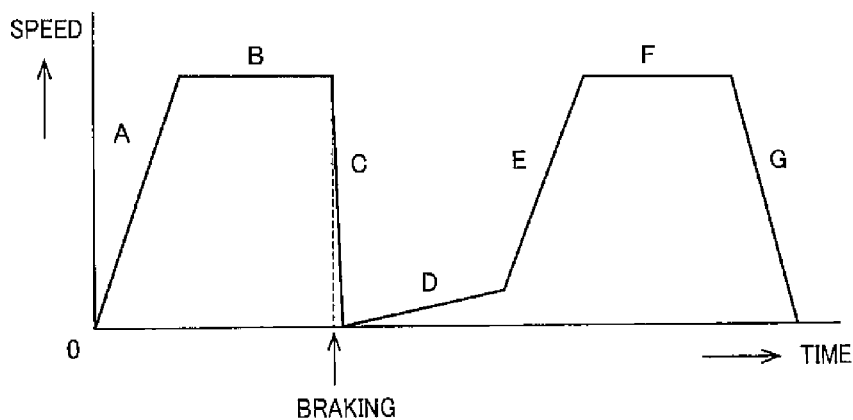
FIG. 20A is an exemplary speed/time chart for explaining the speed imparted to the mold unit by the mixer in order to generate the relative motion between the female mold and the male mold of the mold unit depicted in FIGS. 17-19.

In FIG. 20A, an example of a speed-time profile of the speed (i.e., at least the rotational speed from among the rotational speed and the orbiting speed) imparted to the mold unit 140 by the mixer 40 is illustrated by a graph.

In the example depicted in FIG. 20A, the speed change profile is the same for the rotational speed (the frequency of rotations) and the orbiting speed (the frequency of rotations) of the mold unit 140, but differs in magnitude. During operation of the mixer 40, the rotational direction of the mold unit 140 constantly matches the direction from the first portion 170 to the fourth portion 176 of each elongated guide hole 162 formed in the cylindrical section 156 of the guide cup 150, as illustrated in FIG. 17.

Further, in the example depicted in FIG. 20A, one cycle of speed control includes a first rapid-acceleration interval A, a second constant-speed interval B, a third rapid deceleration interval C, a fourth gradual-acceleration interval D, a fifth rapid acceleration interval E, a sixth constant-speed interval F and a seventh gradual-deceleration interval G.

During the first rapid-acceleration interval A, the motor 50 is driven in the rapid acceleration mode, to thereby accelerate the female mold 142 in the rotational direction. As a result of this, as illustrated in FIG. 17, an inertial force acts on the male mold 144 in the opposite direction of the direction that the second portion 172 extends out from the terminal end (the lowest position) of the first portion 170 (opposite to the rotational direction of the female mold 142). As a result, the guide pins 160 are pressed against the side wall of the first portions 170 in the initial position depicted in FIG. 17.

During the second constant-speed interval B, the motor 50 is driven in the constant speed mode, to thereby rotate and orbit both of the female mold 142 and the male mold 144 at a constant speed. During this time, the guide pins 160 are held in the initial position depicted in FIG. 17. At this point in time, because the male mold 144 is not yet closely engaged with the female mold 142, the liquid mixture within the female mold 142, despite having a high viscosity, is efficiently agitated/degassed in a state of being highly fluid. During this second constant-speed interval B, the liquid mixture is urged to completely fill, cover and/or coat the surface of the female mold 142.

Figure 18:
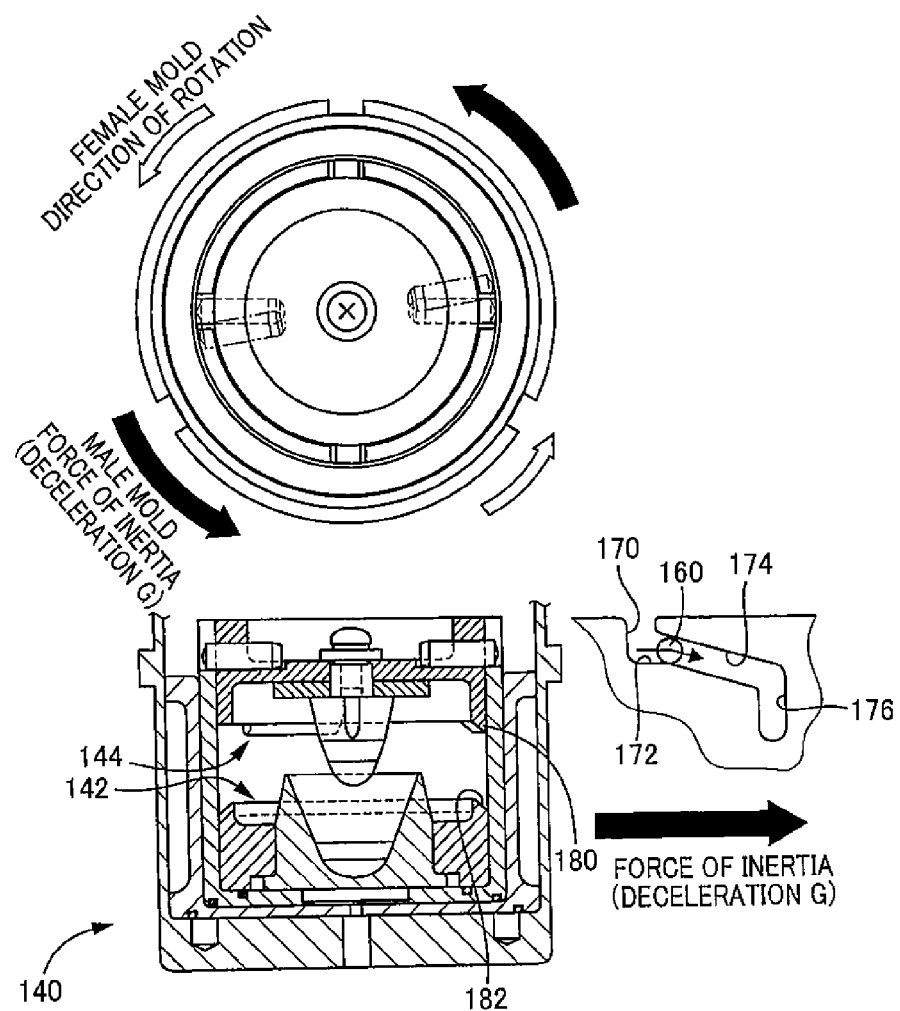
FIG. 18 is another plan view, another cross-sectional view and another enlarged cutaway view for explaining the principles of the relative motion between the female mold and the male mold of the mold unit depicted in FIG. 15.

During the third rapid-deceleration interval C, the brake 94 is activated with the motor 50 powered off, to thereby decelerate the female mold 142 in the rotational direction. As a result of this, as illustrated in FIG. 18, an inertial force acts on the male mold 144 in the same direction as the direction that the second portion 172 extends out from the terminal end (the lowest position) of the first portion 170 (the same direction as the rotation directional of the female mold 142). As a result, the guide pins 160 move away from the initial position depicted in FIG. 17, and towards the terminal end of the second portion 172 (the rightmost position), to thereby allow or enable the male mold 144 to rotate coaxially relative to the female mold 142.

If the inertial force continuously acts on the male mold 144 in the same direction, the guide pins 160 will move from the terminal end (the rightmost position) of the second portion 172 shown in FIG. 18 into the third portion 174 and then along the third portion 174. The third portion 174 is inclined relative to the circumferential direction of the male mold 144. Therefore, the male mold 144 moves axially and gradually approaches the female mold 142. The guide pins 160 eventually reach the terminal end (the rightmost position) of the third portion 174.

In the present embodiment, the third portion 174 is inclined downwardly relative to the circumferential direction of the male mold 144. For this reason, as compared to an embodiment in which the third portion 174 is not inclined, the guide pins 160 are less likely to move back along the third portion 174 against gravity in an undesired manner.

Figure 19:
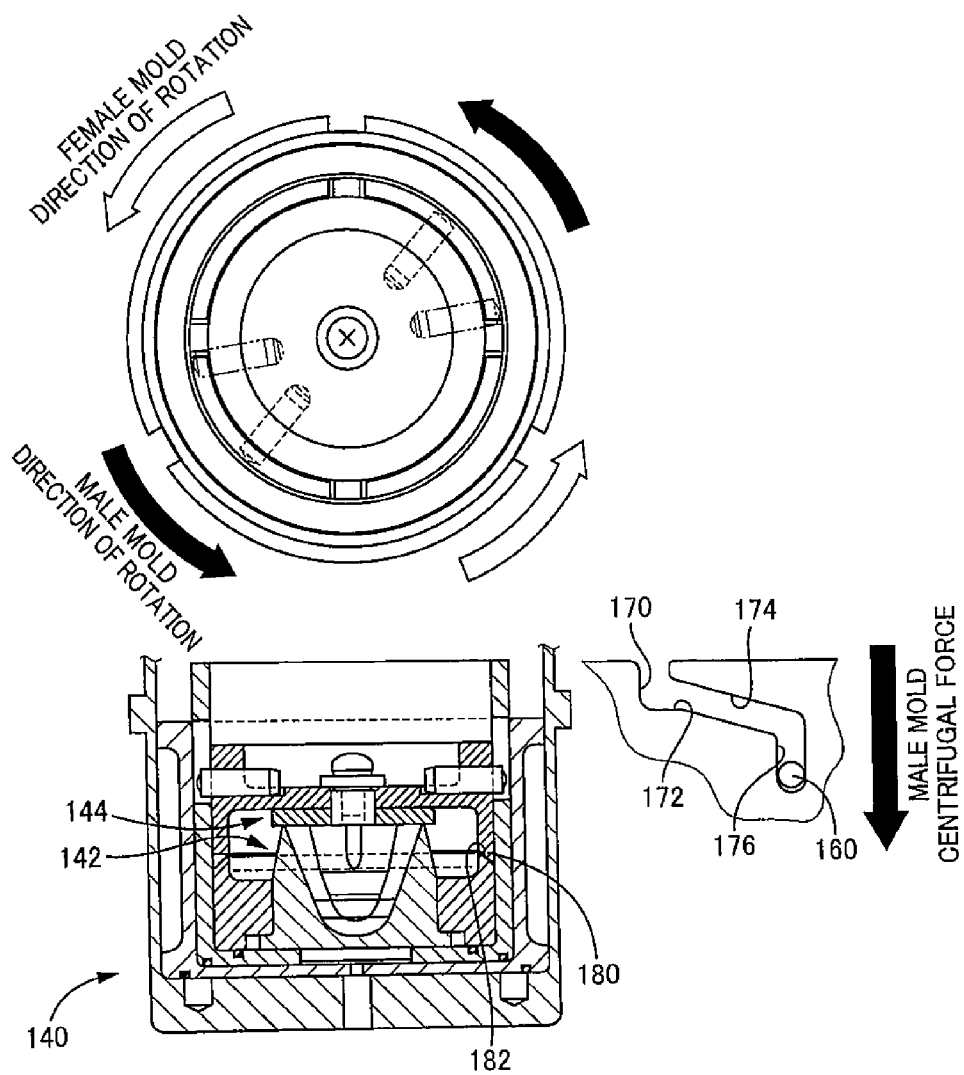
FIG. 19 is still another plan view, still another cross-sectional view and still another enlarged cutaway view for explaining the principles of the relative motion between the female mold and the male mold of the mold unit depicted in FIG. 15.

During the fourth gradual-acceleration interval D, the motor 50 is driven in the gradual acceleration mode with the guide pins 160 positioned at the fourth portion 176, to thereby accelerate the male mold 144 in the orbital direction. As a result, the male mold 144 is subjected to a centrifugal force that increases over time. Because the centerline (i.e., the rotational axis) of the male mold 144 is inclined relative to the orbital axis, the geometry of the system results in that the overall centrifugal force contains an axial component (hereinafter, referred to as "axial centrifugal force") and a radial component. The axial centrifugal force acts on the male mold 144 in the direction (i.e. the downward direction) that causes the male mold 144 to move towards the female mold 142. As a result, the guide pins 160 descend along the fourth portion 176 and move towards the female mold 142 as illustrated in FIG. 19. As will be discussed below, the overall centrifugal force can be decomposed or resolved into its respective axial and radial components by one or more structural features (e.g., a slanted surface) of the system so that, e.g., only the axial centrifugal force is applied to a particular structural element.

During this fourth gradual-acceleration interval D, the axial centrifugal force acting on the male mold 144 increases at a more gradual gradient than when the motor 50 is driven in the rapid acceleration mode. Therefore, the male mold 144 approaches the female mold 142 at a low speed. Thus, the male mold 144 is prevented from rushing into the liquid mixture within the female mold 142 at too high of a speed, which could undesirably incorporate or entrain air into the liquid mixture.

As illustrated in FIG. 19, if the axial centrifugal force continuously acts on the male mold 144, a stop 180 disposed on a forward facing surface of the male mold 144 will eventually abut on an abutment surface 182 disposed on a rearward facing surface of the female mold 142, whereby the male mold 144 reaches its proximal limit to the female mold 142. As a result, the male mold 144 is brought into close engagement with the female mold 142.

During the fifth rapid-acceleration interval E, the motor 50 is driven in the rapid acceleration mode, to thereby rapidly accelerate the mold unit 140 in both the rotational direction and the orbital direction (at a steeper gradient than the preceding fourth gradual-acceleration interval E).

During the sixth constant-speed interval F, the motor 50 is driven in the constant speed mode, to thereby rotate/orbit the female mold 142 and the male mold 144 together at a constant speed. As a result, the liquid mixture within the narrow cavity, which is defined by the female mold 142 and the male mold 144, is agitated/degassed in a partial vacuum. During this sixth constant-speed interval F, the liquid mixture is also urged to completely fill, coat or cover the surface(s) of the female mold 142 and the male mold 144.

During the seventh gradual-deceleration interval G, the motor 50 is driven in the deceleration mode, to thereby decelerate the female mold 142 and the male mold 144 together in both the rotational direction and the orbital direction. During this seventh gradual-deceleration interval G, a more gradual speed gradient is realized than the third rapid-deceleration interval C, because the brake 94 is not actuated. Eventually, the female mold 142 and the male mold 144 will stop moving.

The agitating/degassing process according to the present embodiment will now be described in detail below with reference to FIG. 21.

This agitating/degassing process begins with step S31, in which the male mold 144 is attached to the female mold 142 that has been filled with the liquid mixture as illustrated in FIG. 15, such that, although the female mold 142 and the male mold 144 are movable towards each other, the female mold 142 and the male mold 144 are spaced apart from each other (see FIG. 8A), to thereby perform the assembly process of assembling the mold unit 140.

Next, in step S32, a disposing process is performed such that the assembled mold unit 140 is disposed in the mixer 40 as illustrated in the center drawing of FIG. 8B.

Subsequently, in step S33, a prevention process is initiated when the mixer 40 is actuated and is performed during the mold-closing prevention period. The prevention processes prevents the male mold 144 from moving towards the female mold 142 and from bringing the male mold 144 into close engagement with the female mold 142 due to the centrifugal force generated by the orbiting of the mold unit 140. In the present embodiment, the mold-closing prevention period is defined as including the first rapid-acceleration interval A, the second constant-speed interval B and the third rapid-deceleration interval C as illustrated in FIG. 20A.

In parallel with the above-described step S33, a first agitating/degassing process is performed during the mold-closing prevention period in step S34, such that the liquid mixture is agitated/degassed within the female mold 142 using the mixer 40 while the male mold 144 is disengaged from the female mold 142.

Subsequently, in step S35, a permitting process is performed during the mold-closing permissible period, which follows the mold-closing prevention period, while the mixer 40 is operating. This permitting process permits the male mold 144 to move towards the female mold 142 to bring the male mold 144 into close engagement with the female mold 142 due to the centrifugal force acting on the male mold 144. In the present embodiment, the mold-closing permission period is defined as including the fourth gradual-acceleration interval D, the fifth rapid-acceleration interval E, the sixth constant-speed interval F and the seventh gradual-deceleration interval G, as illustrated in FIG. 20A.

In parallel with the above-described step S35, a subsequent agitating/degassing process is performed in step S36 during the mold-closing permission period, while the male mold 144 is closely engaged with the female mold 142. In the subsequent agitating/degassing process, the liquid mixture is agitated/degassed within the cavity of the mold unit 140 using the mixer 40.

In the first embodiment illustrated in FIGS. 8A and 8B, prior to performing the process (i.e., step S5 depicted in FIG. 2) of agitating/degassing the liquid mixture by rotating/orbiting the entire mold unit 100, which has the cavity 110 filled with the liquid mixture, using the mixer 40, the process (i.e., step S4 depicted in FIG. 2) of agitating/degassing the liquid mixture is performed by rotating/orbiting only the female mold 102, which has been filled with the liquid mixture, using the mixer 40. Thus, the agitation/degassing of the liquid mixture within the female mold 102 using the mixer 40 is carried out in two sub-periods.

Because the agitating/degassing of step S5 is performed while the liquid mixture is confined within the narrow cavity 110 in a state of low fluidity, step S4 is performed prior to step S5, in order to agitate/degas the liquid mixture while the liquid mixture is not confined within the female mold 102 and is in a state of high fluidity.

On the other hand, in the present embodiment, step S4 is omitted and step S5 is performed such that both a first or preliminary process of agitating/degassing the liquid mixture while the male mold 144 is disengaged from the female mold 142 and a main or subsequent process of agitating/degassing the liquid mixture while the male mold 144 is engaged with the female mold 142 are performed during a continuous operation of the mixer 40.

Therefore, the present embodiment provides the possibility of agitating/degassing the liquid mixture within the female mold 142 without interrupting the mixer 40, resulting in an improvement in the agitating/degassing efficiency, a reduction in the time required to mold the cap 10 and an improvement in the manufacturing efficiency of the cap 10.

Figure 20B:
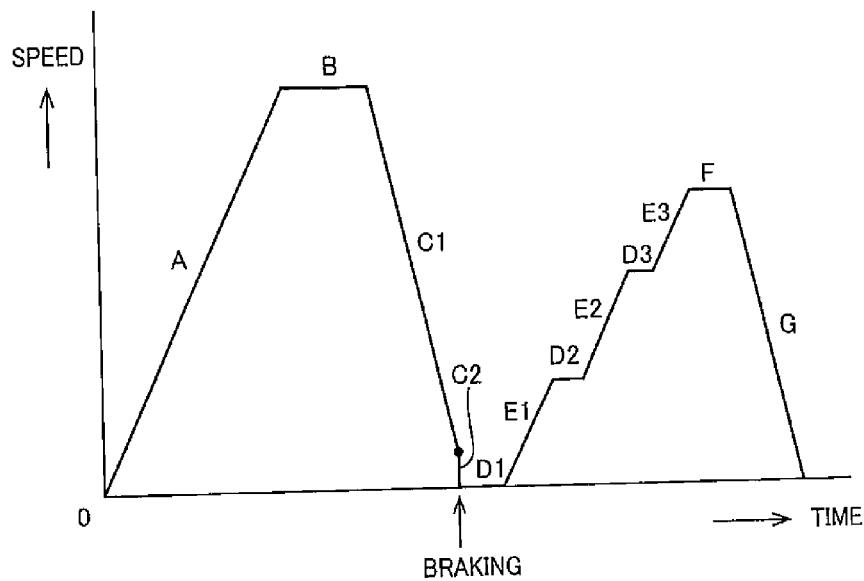
FIG. 20B is another exemplary speed/time chart of another embodiment.

In FIG. 20B, an example of a modified version of the example of the speed/time chart depicted in FIG. 20A (hereinafter, referred to as "the first example") is illustrated with a graph.

The speed/time chart in the example depicted in FIG. 20B (hereinafter, referred to as "the second example") shares the same basic speed profile as the speed/time chart in the first example.

More specifically, in this second example, the motor 50 is driven in the rapid acceleration mode during the first rapid-acceleration interval A. The motor 50 is driven in the constant speed mode during the second constant-speed interval B and during the sixth constant-speed interval F. The motor 50 is driven in the deceleration mode during the seventh gradual-deceleration interval G.

This second example is similar to the first example, except for the third rapid-deceleration interval C that employs, as an alternative interval, a series of a deceleration interval C1, in which the motor 50 is driven in the deceleration mode without actuating the brake 94, and a deceleration interval C2, in which the brake 94 is actuated.

In this second example, differently from the first example, the motor 50 is current-controlled (electronic braking) during the first deceleration interval C1, to thereby reduce the rotational speed and the orbiting speed to sufficiently close to zero without relying on the brake 94. During the subsequent deceleration interval C2, the brake 94 is actuated to thereby impart an inertial (mechanical braking) force to the rotational direction of the male mold 144. In this second example, because the speed of the rotatable frame 54 when the brake 94 begins operation is less than in the first example, the load on the brake 94 and the motor 50 is reduced.

Further, in this second example, a series of three constant-speed intervals D1, D2 and D3 interleaved with three rapid-acceleration intervals E1, E2 and E3 are used as intervals corresponding to the series of the fourth gradual-acceleration interval D and the fifth rapid-acceleration interval E, as described in the first example. During each of the constant-speed intervals D1, D2 and D3, the motor 50 is driven in the constant speed mode, while during each of the rapid-acceleration intervals E1, E2 and E3, the motor 50 is driven in the rapid acceleration mode.

In this second example, by interleaving or alternating the constant speed modes with the rapid acceleration modes, the male mold 144 will experience a lesser centrifugal force than an alternative that utilizes a continuous rapid acceleration mode. As a result, when the male mold 144 is approaching the female mold 142 due to the centrifugal force acting on the male mold 144 and the guide pins 160 are descending into the fourth portion 176, as illustrated in FIG. 19, this descending speed is reduced. Therefore, this second example, like the first example, prevents the male mold 144 from rushing into the liquid mixture within the female mold 142 at too high of a speed, which could undesirably incorporate or entrain air into the liquid mixture.

It is noted that, in the present embodiment, the brake 94 generates the inertial force required for moving the guide pins 160 from a locked position, which prevents the male mold 144 from approaching the female mold 142, to an unlocked position that permits this approaching movement. On the other hand, in case the required inertial force can be generated using only the current control (electronic braking) of the motor 50, it is not necessary to operate the brake 94.

Next, a cap molding method according to a fourth embodiment of the present teachings will be described. The present embodiment, however, is similar to the third embodiment, except for the structure of the mold unit and the speed control for the mixer. Therefore, the present embodiment will be described in detail with regard to only the elements that differ from those of the third embodiment, while a redundant description of the elements common with those of the third embodiment will be omitted.

In the third embodiment, as described above, the mold unit 140 is configured to include the guide pins 160 (each is an example of the "first member" set forth in the above mode (5)), which integrally move with the male mold 144, and the elongated guide holes 162 (each is an example of the "second member" set forth in the same mode), which integrally move with the female mold 142. The guide pins 160 move along the elongated guide holes 162, each having a predetermined path, due to the cooperative action of the inertial force, which that acts on the male mold 144 in the rotational direction of the male mold 144 because of its rotation and which varies over time at least in the direction of the force, and the axial centrifugal force, which acts on the male mold 144 because of its orbiting and which varies over time in the magnitude of the force. As a result, the operational state of the male mold 144 is switched between a state, in which the male mold 144 is prevented from closely engaging with the female mold 142, and a state, in which the male mold 144 is permitted to closely engage the female mold 142.

Thus, in the third embodiment, the relative motion between the guide pins 160 and the elongated guide holes 162 takes place without using any additional intervening movable-members, thereby making it easy to reduce the total part count.

In contrast, in the present embodiment, the relative motion between the guide pins 160 and guide grooves takes place using an additional intervening movable-member, in order to improve its stability and to simplify the design. Further, in the present embodiment, the speed control for the mixer 40 is performed, not using the brake 94, but rather using current control for the motor 50.

FIG. 22A illustrates in a plan view a mold unit 200 for use in performing the cap molding method according to the present embodiment. This mold unit 200 is similar in basic configuration to the mold unit 140 according to the third embodiment depicted in FIG. 17; therefore, this mold unit 200 will be described below with duplicative description omitted. While the mold unit 140, as illustrated in FIG. 17, includes the guide cup 150 and the spacer 152, the mold unit 200 according to the present embodiment replaces the guide cup 150 and the spacer 152 with a guide cup 210 and a movable member 212.

FIG. 22A illustrates in a plan view only the assembly of the guide cup 210 and the movable member 212, extracted from the mold unit 200, while FIG. 22B illustrates the assembly in a side cross-sectional-view.

As illustrated in FIG. 22B, the guide cup 210 includes a bottom section 222, which forms generally a circular plate shape. A lower flange 224 extends radially outwardly from the bottom section 222. The guide cup 210 further includes a cylindrical section 226 that extends coaxially with and vertically from the bottom section 222. Through-holes 227 serving as airflow holes are formed in the cylindrical section 226. A through-hole 228 serving as an airflow hole is formed in the bottom section 222. Notches 230 are formed on an outer circumferential edge of the lower flange 224 through the thickness of the lower flange 224, and are located at circumferentially spaced apart positions. Each notch 230 serves as an airflow hole. One representative, non-limiting example of a material that may be used to form the guide cup 210 is POM.

Similar to the embodiment illustrated in FIG. 17, the outer circumferential surface of the female mold 142 fits in the inner circumferential surface of the cylindrical section 226. The female mold 142 is rigidly affixed to the guide cup 210 with the female mold 142 contacting the bottom section 222. On the other hand, the outer circumferential surface of the lower flange 224 fits in the inner circumferential surface of the mold-attachment cup 154 depicted in FIG. 17. The guide cup 210 is rigidly affixed to the mold-attachment cup 154 with the guide cup 210 contacting the bottom section of the mold-attachment cup 154.

Similar to the embodiment illustrated in FIG. 17, the outer circumferential surface of the male mold 144 fits in the inner circumferential surface of the cylindrical section 226, so that the male mold 144 is coaxially movable and rotatable relative to the cylindrical section 226. The motion of the male mold 144 relative to the guide cup 210 (in addition, the female mold 142 is rigidly affixed to the guide cup 210), however, is limited due to the cooperative action of the guide pins 160 of the male mold 144 (see FIG. 17) and first guide grooves 232 formed in the cylindrical section 226. As illustrated in FIG. 22B, each first guide groove 232 extends generally axially from an uppermost surface of the cylindrical section 226 towards the bottom section 222. Each first guide groove 232 is open at the uppermost surface of the cylindrical section 226.

Figure 24:
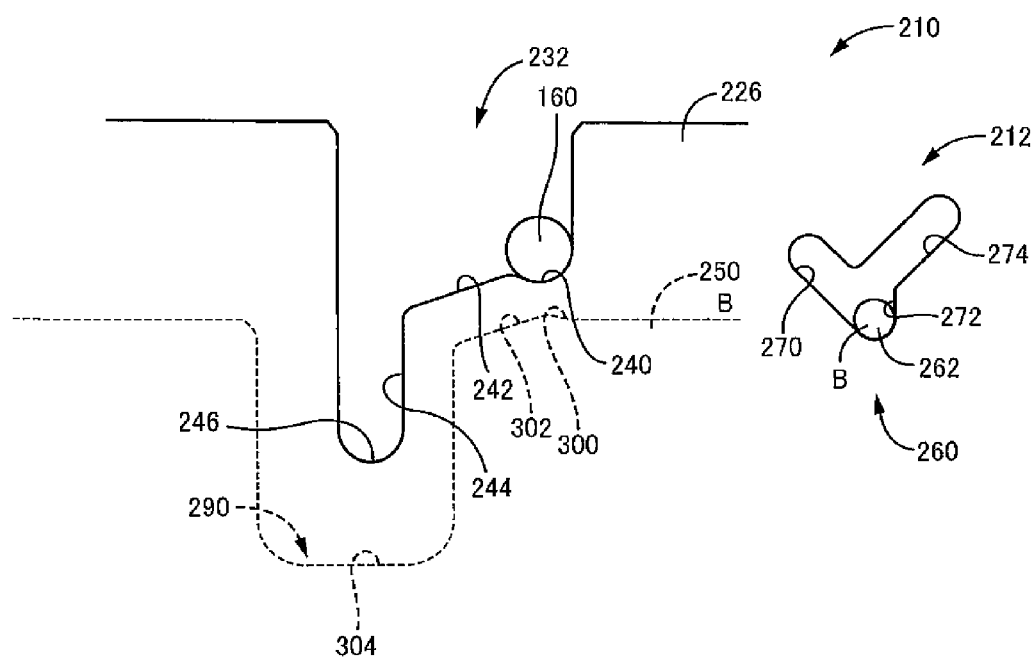
FIG. 24 is an enlarged cutaway front view illustrating the first guide groove and the engagement portion when the guide pin is located in position B within the mold unit depicted in FIG. 22.

As illustrated with enlargement in FIG. 24, the bottom surface of each first guide groove 232 includes a first section 240, a second section 242, a third section 244 and a fourth section 246. The first and fourth sections 240 and 246 each comprise a downwardly convex arc shape that is partially complementary to the outer circumferential surface of the respective guide pin 160.

In particular, the first section 240 plays an important role in preventing the male mold 144 from engaging with the female mold 142, while the fourth section 246 plays an important role in permitting the male mold 144 to engage with the female mold 142. For this reason, the fourth section 246 is closer in position to the female mold 142 than the first section 240.

The second section 242 extends obliquely and has a straight segment that interconnects the first section 240 with an upper end of the third section 244. The second section 242 has a slanted surface that contacts the guide pin 160 (an example of the aforementioned "second slanted surface"). This slanted surface functions to decompose or separate the axial centrifugal force (the downward force) acting on the male mold 144 during its orbiting by the mixer 40, to thereby convert the axial centrifugal force into a rotational force acting on the male mold 144 (i.e. only the force component from the axial centrifugal force that acts in the rotational direction is applied to the male mold 144). This second section 242 is inclined, relative to an imaginary straight line extending from the first section 240 in the circumferential direction of the cylindrical section 226, in a direction that extends towards the fourth section 246. The third section 244 is a straight segment that extends vertically from the fourth section 246 in a direction extending away from the female mold 142.

As illustrated in FIG. 22B, the movable member 212 has a cylindrical section 250 and an upper flange 252 that extends radially outwardly from a bottom of the cylindrical section 250. Notches 254 are formed on the outer circumferential edge of the upper flange 252 through the thickness of the upper flange 252, and are located at circumferentially spaced apart positions. Each notch 254 serves as an airflow hole. The outer circumferential surface of the upper flange 252 fits in the inner circumferential surface of the mold-attachment cup 154 depicted in FIG. 17, so that the upper flange 252 is axially movable and coaxially rotatable relative to the mold-attachment cup 154.

The upper flange 252 is located above the lower flange 224. The upper flange 252 and the lower flange 224 cooperate to provide the same function as the spacer 152 depicted in FIG. 17.

As illustrated in FIG. 22B, the outer circumferential surface of the cylindrical section 226 of the guide cup 210 fits in the inner circumferential surface of the cylindrical section 250 of the movable member 212, so that the guide cup 210 is axially movable and coaxially rotatable relative to the movable member 212. The guide cup 210 acts as a stationary member relative to the movable member 212. One representative, non-limiting example of a material that may be used to form the movable member 212 is POM.

The possible range of motion of the movable member 212 relative to the guide cup 210, however, is limited as illustrated in FIG. 22C, due to the cooperative action of second guide grooves 260 (in the present embodiment, there are two that are diametrically opposed to each other), which are formed through the thickness of the cylindrical section 226, and radially-extending guide pins 262 (in the present embodiment, there are two that are diametrically opposed to each other) that are rigidly affixed to the cylindrical section 250 of the movable member 212.

As illustrated in FIG. 22C, each second guide groove 260 is generally V-shaped as a whole. FIG. 22C illustrates one of the second guide grooves 260 as viewed from the outside of the guide cup 210 in the radial direction. In addition, FIG. 22B illustrates one of the first guide grooves 232 as viewed from the inside of the guide cup 210 in the radial direction. FIGS. 23-26 each illustrate one first guide groove 232 and one second guide groove 260 as viewed from the inside of the guide cup 210 in the radial direction.

Figure 23:
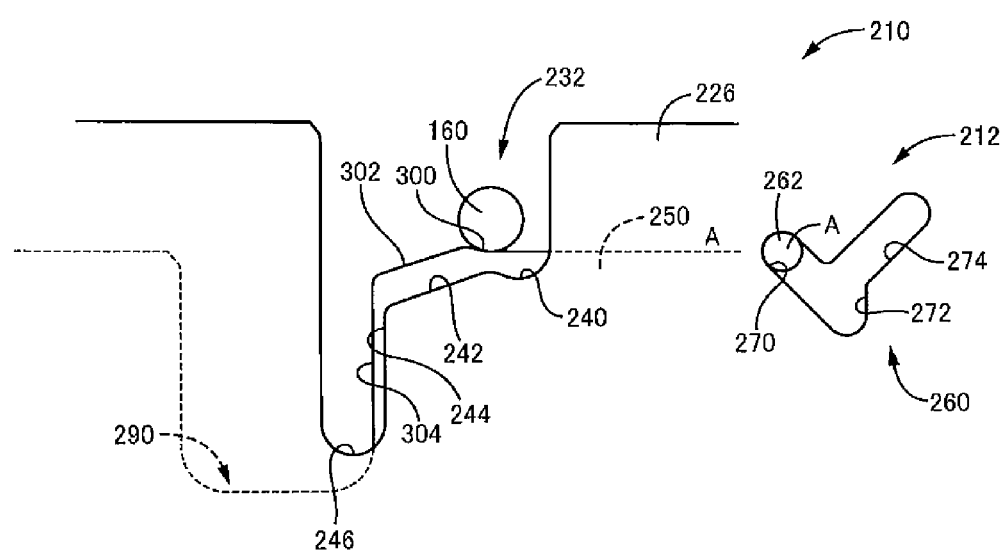
FIG. 23 is an enlarged cutaway front view illustrating a first guide groove and an engagement portion when a guide pin is located in position A within the mold unit depicted in FIG. 22.

As illustrated in FIG. 23, the guide pin 262 (or the movable member 212), which slidably fits in the second guide groove 260, is movable relative to the second guide groove 260 (or the guide cup 210). Because the second guide groove 260 has a closed groove shape, the second guide groove 260 and the guide pin 262 cooperate to limit the motion of the movable member 212 relative to the guide cup 210, not only axially but also rotationally.

As illustrated with enlargement in FIG. 23, the second guide groove 260 includes a first section 270, which is a straight segment obliquely and downwardly extending from an upper end thereof, a second section 272 vertically extending from a lower end of the first section 270, and a third section 274, which is a straight segment obliquely and upwardly extending from an upper end of the second section 272.

The first section 270 approximates (i.e. it is substantially identical to) the overall shape of the second guide groove 260 and corresponds to one of two arms of the letter "V", while the third section 274 corresponds to the other arm. The second section 272 connects the first section 270 with the third section 274. The first through third sections 270, 272 and 274 are arranged in order in one rotational direction of the guide cup 210. The upper end of the third section 274 is higher than the upper end of the first section 270.

The first section 270 decomposes or separates a downward force acting on the movable member 212 (i.e., the magnitude of the axial centrifugal force acting on the movable member 212 due to the orbiting minus the elastic force of a spring 280). The first section 270 has a slanted surface (the lower surface of the first section 270; one example of the aforementioned "first slanted surface") that converts that portion or component of the downward force into a rotational force acting on the movable member 212. The third section 274 decomposes or separates an upward force acting on the movable member 212 (i.e., the magnitude of the elastic force of the spring 280 minus the axial centrifugal force). The third section 274 has a slanted surface (the upper surface of the third section 274; another example of the aforementioned "first slanted surface") that converts that portion or component of the upward force into a rotational force acting on the movable member 212. The rotational forces generated by the first and third sections 270 and 274 both have the same direction.

Figure 25:
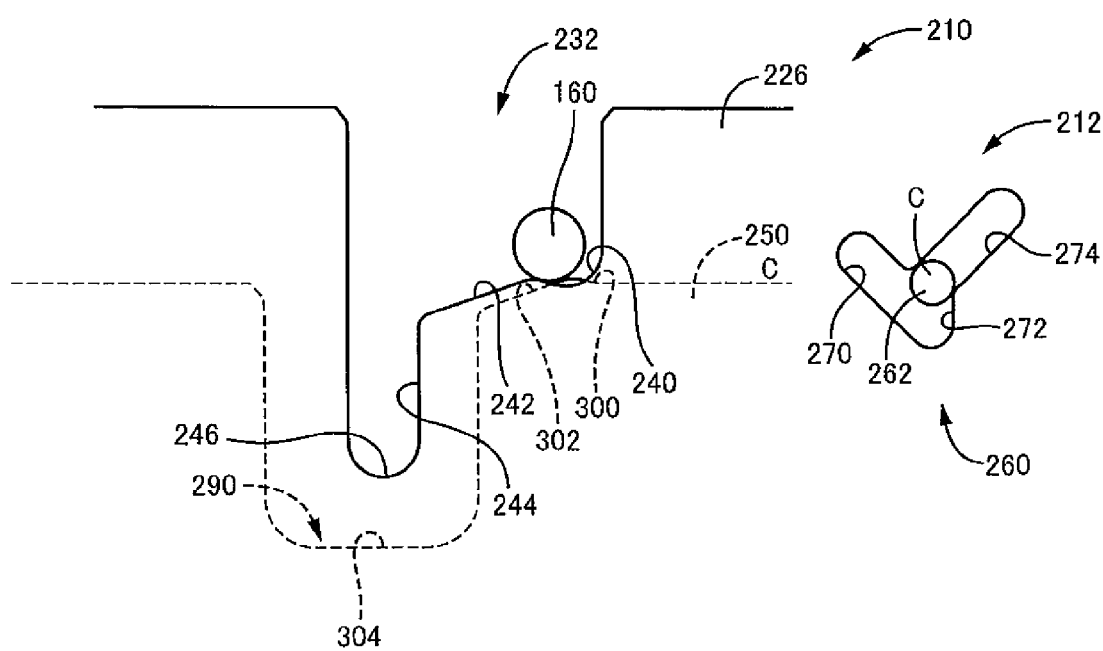
FIG. 25 is an enlarged cutaway front view illustrating the first guide groove and the engagement portion when the guide pin is located in position C within the mold unit depicted in FIG. 22.
Figure 26:
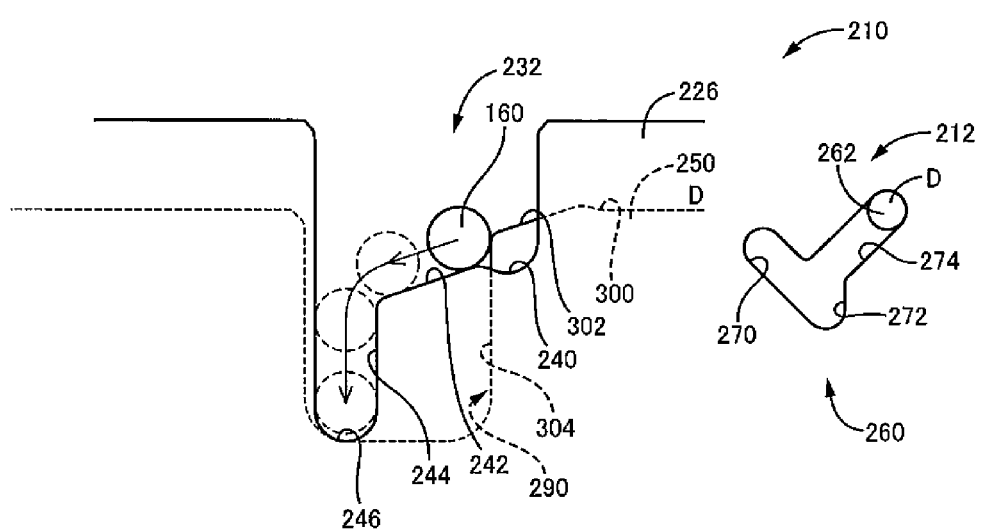
FIG. 26 is an enlarged cutaway front view illustrating the first guide groove and the engagement portion when the guide pin is located in position D within the mold unit depicted in FIG. 22.

FIG. 23 indicates that the guide pin 262 is located at Position A, i.e., the position of the upper end of the first section 270. FIG. 24 indicates that the guide pin 262 is located at Position B (i.e., the position of the lower stroke end of the movable member 212). That is, it is located at the position of the lower end of the first section 270. FIG. 25 indicates that the guide pin 262 is located at Position C, i.e., the position of the upper end of the second section 272. FIG. 26 indicates that the guide pin 262 is located at Position D, i.e., the position of the upper end of the third section 274. FIG. 22B indicates that the guide pin 262 is located at Position D (i.e., the position of the upper stroke end of the movable member 212).

As illustrated in FIG. 22B, the spring 280, which has a coil shape and is an example of an elastic member according to the aforementioned modes, is interposed between the guide cup 210 and the movable member 212. In the present embodiment, the spring 280 is disposed so as to coaxially extend along and surround the cylindrical section 226. The bottom end of the spring 280 is supported on an upward surface of the lower flange 224 and the top end of the spring 280 is supported on a downward face of the upper flange 252 via the retainer 282. The spring 280 is adapted or configured to always bias the movable member 212 relative to the guide cup 210 in the direction that causes the movable member 212 to move axially away from the guide cup 210. Limits in moving the movable member 212 towards and away from the guide cup 210 vary depending on the rotational position of the guide pins 262 within and relative to the second guide grooves 260, and thus, vary depending on the rotational position of the movable member 212 relative to the guide cup 210.

As illustrated in FIG. 22B, engagement portions 290 are formed in the cylindrical section 226 of the movable member 212. Each engagement portion 290 moves integrally with the movable member 212 and, as illustrated in FIG. 23, changes the apparent or effective shape of the bottom of each first guide grooves 232 for the guide pin 160, to thereby control the position of each guide pin 160.

The initial position of each guide pin 262 is Position A depicted in FIG. 23. In this state, the mixer 40 starts the rotation/orbiting of the mold unit 200. As a result, the axial centrifugal force acting on the movable member 212 increases from zero. When the axial centrifugal force overcomes the preload of the spring 280 shown in FIG. 22B, the movable member 212 descends while rotating in one direction due to the slanted surface of the first section 270 of the second guide groove 260. As a result, the guide pin 262 will move from Position A to Position B. FIG. 22B illustrates in solid lines the spring 280 when situated in a fully extended position (Position D of guide pin 262); FIG. 22B illustrates in dotted lines the spring 280 when situated in a fully compressed position (Position B of guide pin 262).

Thereafter, when the orbiting speed of the mold unit 200 shifts from an increasing phase (or a constant speed phase) to a decreasing phase, the axial centrifugal force acting on the movable member 212 decreases, resulting in movement of each guide pin 262 from Position B to Position C. Subsequently, the guide pin 262 ascends while rotating in the same direction due to the slanted surface of the third section 274 of the second guide groove 260. As a result, guide pin 262 will move from Position C to Position D.

As illustrated in FIG. 23, each engagement portion 290 includes a first section 300 extending generally in parallel with the circumferential direction of the cylindrical section 226, a second section 302 extending obliquely relative to the circumferential direction of the cylindrical section 226 and a third section 304 that constitutes a notch (recess).

As illustrated in FIG. 23, when the guide pin 262 is in Position A, the first section 300 of each engagement portion 290 changes the apparent or effective shape of the first section 240 of each first guide groove 232, so that the male mold 144 is more reliably prevented from being brought into close engagement with the female mold 142. More specifically, each first section 300 lifts each guide pin 160 (the male mold 144).

Further, when each guide pin 262 is in Position A, the third section 304 of each engagement portion 290 changes the apparent or effective shape of the fourth section 246 of each first guide groove 232, so that the male mold 144 is more reliably prevented from being brought into close engagement with the female mold 142. More specifically, the third section 304 narrows the apparent or effective groove width of the third section 244 of each first guide groove 232, to thereby prevent each guide pin 160 from entering the third section 244, from becoming closer to the fourth section 246, and from bringing the male mold 144 into close engagement with the female mold 142.

As illustrated in FIG. 24, when the guide pin 262 is in Position B, each engagement portion 290 descends to a lower position than in Position A, and rotates in the direction that allows each engagement portion 290 to move towards the first section 240 of each first guide groove 232. At this time, the first section 300 of each engagement portion 290 permits each guide pin 160 to be brought into contact with the first section 240 of each first guide groove 232, and the third section 304 permits each guide pin 160 to move downward along the third section 244 of each first guide groove 232. The reason is that the third section 304 moves away from the groove of each first guide groove 232 in the rotational direction, to thereby allow each guide pin 160 to enter the third section 244 and become closer to the fourth section 246, and to thereby allow the male mold 144 to be brought into close engagement with the female mold 142.

At this stage, while it is possible that each guide pin 160 will overcome the protrusion of each first guide groove 232, which is located between the first section 240 and the second section 242, and the male mold 144 will be brought into close engagement with the female mold 142, it is also possible that each guide pin 160 cannot overcome the protrusion and thus the male mold 144 will not be brought into close engagement with the female mold 142.

As illustrated in FIG. 25, when the guide pin 160 is in Position C, each engagement portion 290 ascends to a higher position than in Position B, and allows the protrusion of each engagement portion 290, which is located between the first section 300 and the second section 302 to push up each guide pin 160, to thereby help each guide pin 160 overcome the protrusion of each first guide groove 232. At this stage, while it is possible that the male mold 144 will be brought into close engagement with the female mold 142, it is also possible that the male mold 144 will not be brought into close engagement with the female mold 142.

As illustrated in FIG. 26, when each guide pin 262 is in Position D, each engagement portion 290 ascends to a higher position than in Position C and rotates in the direction that allows each engagement portion 290 to move towards the first section 240 of each first guide groove 232. During a transition period, in which the guide pin 262 moves from Position C to Position D, because the first section 300 and the second section 302 move away from the guide pin 160, the guide pin 160 will be located in the space within the third section 304. As a result, before the point in time that the guide pin 262 reaches Position D, the guide pin 160 crosses the slanted surface of the second section 242 and descends along the third section 244. At this time, the male mold 144 moves due the axial centrifugal force and is brought into close engagement with the female mold 142.

Figure 27A:
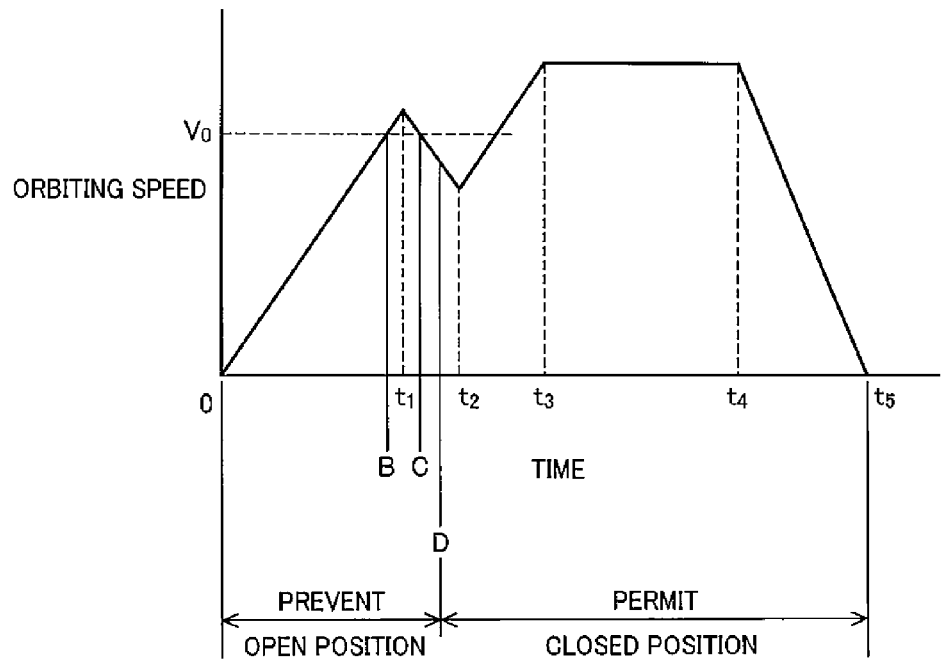
FIG. 27A is an exemplary speed/time chart for explaining the orbiting speed imparted to the mold unit depicted in FIG. 22.

In FIG. 27A, an example of a profile of a time-varying orbiting speed of the mold unit 200, which is performed by controlling the mixer 40 without using the brake 94, is illustrated by a graph.

As illustrated in FIG. 27A, during the period from time t0 to t1, the orbiting speed increases from zero, to thereby increase the axial centrifugal force acting on the movable member 212. During this period, the orbiting speed reaches and then exceeds a threshold V0; until the point in time that the threshold V0 is reached, each guide pin 262 stays at Position A depicted in FIG. 23. When the orbiting speed exceeds the threshold V0, the axial centrifugal force acting on the movable member 212 overcomes the elastic force of the spring 280, whereby each guide pin 262 moves from Position A depicted in FIG. 23 to Position B depicted in FIG. 24.

During the subsequent period from time t1 to t2, the orbiting speed decreases, to thereby decrease the axial centrifugal force acting on the movable member 212. During this period, when the elastic force of the spring 280 overcomes the axial centrifugal force acting on the movable member 212, each guide pin 262 will move from Position B depicted in FIG. 24 to Position C depicted in FIG. 25, with subsequent movement of each guide pin 262 to Position D depicted in FIG. 26.

Before each guide pin 262 reaches a position just before Position D, a close engagement of the male mold 144 in the female mold 142 remains prohibited; when each guide pin 262 reaches the position just before Position D, the close engagement of the male mold 144 becomes permitted.

Thereafter, the orbiting speed increases from time t2 to t3, the orbiting speed is kept unchanged from time t3 to t4 and the orbiting speed decreases to zero from time t4 to t5. With that, one control cycle for the orbiting speed is concluded.

Figure 27B:
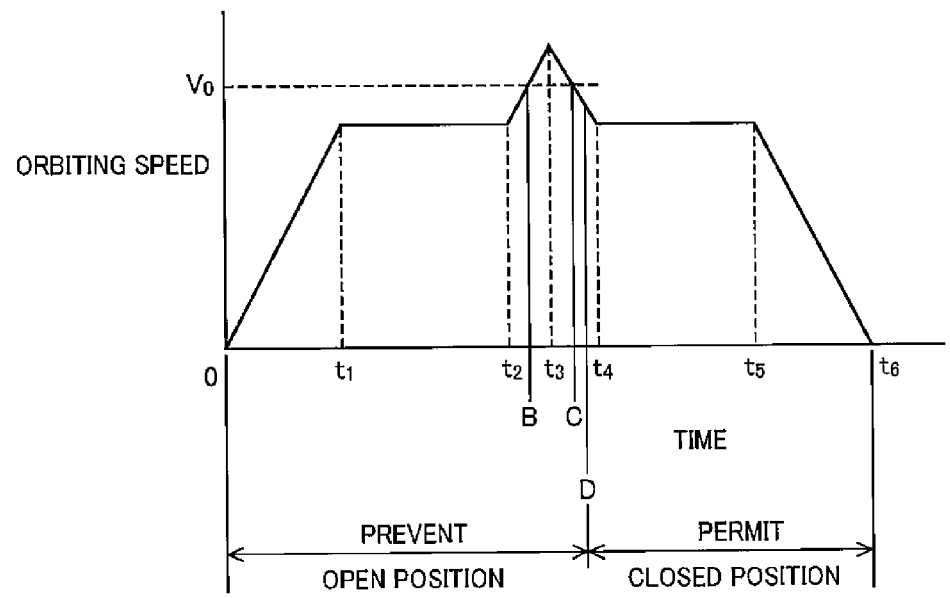
FIG. 27B is another exemplary of the speed/time chart.

In FIG. 27B, another example of a profile of a time-varying orbiting speed of the mold unit 200, which is performed by controlling the mixer 40 without using the brake 94, is illustrated by a graph.

As illustrated in FIG. 27B, during the period from time t0 to t1, the orbiting speed increases from zero, but fails to exceed the threshold V0, resulting in each guide pin 262 staying in Position A. During the subsequent period from t1 to t2, the orbiting speed is kept constant. During the further subsequent period from t2 to t3, the orbiting speed increases again, and once the orbiting speed has exceeded the threshold V0, the axial centrifugal force acting on the movable member 212 overcomes the elastic force of the spring 280, whereby each guide pin 262 moves from Position A to Position B.

During the subsequent period from time t3 to t4, the orbiting speed decreases; once the elastic force of the spring 280 overcomes the axial centrifugal force acting on the movable member 212, each guide pin 262 moves from Position B to Position C, with subsequent movement of each guide pin 262 to Position D. Before each guide pin 262 reaches a position just before Position D, a close engagement of the male mold 144 in the female mold 142 remains prohibited; when each guide pin 262 reaches the position just before Position D, the close engagement of the male mold 144 becomes permitted.

Thereafter, the orbiting speed is kept constant from time t4 to t5 and the orbiting speed decreases to zero from time t5 to t6. With that, one control cycle for the orbiting speed is concluded.

Figure 28:
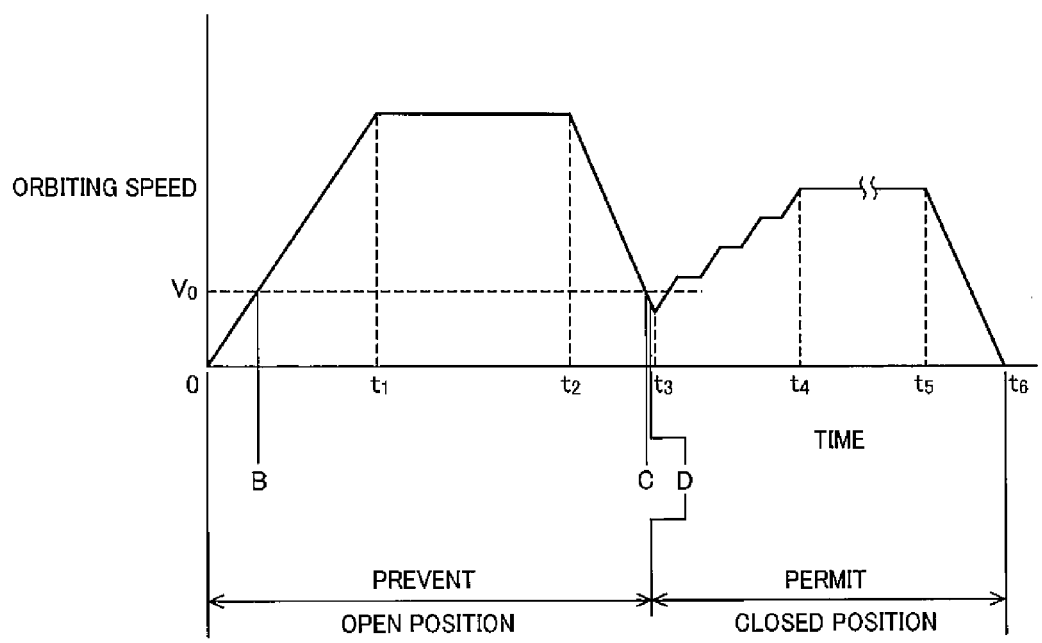
FIG. 28 is still another exemplary speed/time chart for explaining the orbiting speed imparted to the mold unit depicted in FIG. 22.

In FIG. 28, still another example of a profile of a time-varying orbiting speed of the mold unit 200, which is performed by controlling the mixer 40 without using the brake 94, is illustrated in a graph. In this example, the threshold V0 is pre-set to a speed closer to zero than those of the two preceding examples.

As illustrated in FIG. 28, during the period from time t0 to t1, the orbiting speed increases from zero; once the orbiting speed has exceeded the threshold V0, the axial centrifugal force acting on the movable member 212 overcomes the elastic force of the spring 280, whereby each guide pin 262 moves from Position A to Position B. During the subsequent period from time t1 to t2, the orbiting speed is kept constant.

During a further subsequent period from time t2 to t3, the orbiting speed decreases; once the elastic force of the spring 280 overcomes the axial centrifugal force acting on the movable member 212, each guide pin 262 moves from Position B to Position C, with subsequent movement of each guide pin 262 to Position D. Before each guide pin 262 reaches a position just before Position D, a close engagement of the male mold 144 in the female mold 142 remains prohibited; when each guide pin 262 reaches the position just before Position D, the close engagement of the male mold 144 becomes permitted. In this example, the male mold 144 is brought into close engagement with the female mold 142 more slowly than in the two preceding examples, triggered by a lesser magnitude of the orbiting speed, or a lesser magnitude of the axial centrifugal force acting on the male mold 144 than those of the preceding two examples. This prevents the male mold 144 from rushing into the liquid mixture within the female mold 142 at too high of a speed, which could undesirably incorporate air into the liquid mixture.

During the subsequent period from time t3 to t4, the motor 50 is driven by repeating the alternating runs of the acceleration modes and the constant speed modes, to thereby increase the orbiting speed at a more gradual gradient than if the motor 50 were to be driven continuously in the same acceleration mode. As a result, the axial centrifugal force acting on the male mold 144 increases with a gradual gradient in accordance therewith. This discontinuous acceleration profile is also conducive to preventing the introduction of air bubbles into the liquid mixture.

Thereafter, the orbiting speed is kept constant from time t4 to t5 and the orbiting speed decreases to zero from time t5 to t6. With that, one control cycle for the orbiting speed is concluded.

It is noted that, in the present embodiment, Positions B, C and D are not collinear in each second guide groove 260, but, in an alternative, Positions B, C and D may be collinear in each second guide groove 260. The reason is that, when each guide pin 262 moves from Position A to Position B, the third section 304 retracts in the rotational direction from the groove of the third section 244 of each first guide groove 232, to thereby permit each guide pin 160 to enter the third section 244 and move towards the fourth section 246 and to thereby bring the male mold 144 into close engagement with the female mold 142.

While several illustrative embodiments of the present teachings have been described above in detail with reference to the drawings, they are just examples, and the present teachings may be embodied in alternative modes, which begin with the modes described in the section titled "Summary," or which are obtained by making various modifications and improvements to the above-described embodiments, in view of the knowledge of those skilled in the art.

It is further noted that this detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved molds and molding methods.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

Finally, all features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A mold unit comprising:
   a female mold and a male mold, which are closely engageable with each other in a selective manner to define a cavity having a desired shape, and are disengageable from each other, wherein the female and male molds are supported so as to be axially movable relative to each other along a direction of a common axis, and so as to be rotatable relative to each other about the common axis;
   at least one guide pin configured to move integrally with one of the female and male molds;
   a guide surface configured to move integrally with the other of the female and male molds, along which guide surface the at least one guide pin is disposed so as to move in contact; and
   an elastic member configured to bias the male mold in a direction away from the female mold,
   wherein: the at least one guide pin, the guide surface and the elastic member are configured to co-operate to enable the female and male molds to have a closest axial-position relative to each other that varies such that, at a first rotational position of the male mold relative to the female mold, a biasing force of the elastic member must be overcome in order to move the male mold axially towards the female mold and the closest axial-position of the male mold relative to the female mold is a first distance, and at a second rotational position of the male mold relative to the female mold, the elastic member does not resist axial movement of the male mold toward the female mold and allows the male mold to be brought into close engagement with the female mold and the closest axial-position of the male mold relative to the female mold is a second distance that is less than the first distance.

2. The mold unit according to claim 1, wherein the guide surface defines a predetermined path of rotational and axial motion of the male mold relative to the female mold.

3. The mold unit according to claim 1, wherein:
   the mold unit is designed for use in rotational molding,
   the male and female molds are configured to orbit around a common orbital axis during the rotational molding, and
   the male and female molds are configured to rotate about a common rotational axis that is inclined relative to the orbital axis during the rotational molding.

4. The mold unit according to claim 3, wherein:
   the rotational position of the male mold relative to the female mold is variable depending on an inertial force acting on the male mold in a rotational direction of the male mold as a function of acceleration or deceleration of a rotating motion of the male mold, and
   the closest axial-position of the male mold relative to the female mold at the second rotational position is variable depending on an axial centrifugal-force acting on the male mold as a function of an orbiting speed of the male mold.

5. The mold unit according to claim 1, further comprising an intervening member interposed between the male and female molds, wherein the male and female molds are configured to undergo relative motion therebetween via the intervening member.

6. The mold unit according to claim 5, wherein the intervening member is shaped to allow a relative axial-position of the at least one guide pin and the guide surface to vary depending on a relative rotational-position of the male and female molds.

7. The mold unit according to claim 1, wherein the at least one guide pin has a longitudinal axis that extends perpendicular to the common axis.

8. The mold unit according to claim 1, wherein:
the at least one guide pin has a longitudinal axis that extends perpendicular to the common axis, and
the at least one guide pin and the guide surface are configured such that sliding movement of the at least one guide pin along the guide surface causes the male mold to rotationally and axially move relative to the female mold.

9. The mold unit according to claim 8, wherein the at least one guide pin comprises two guide pins that each have a longitudinal axis that extends perpendicular to the common axis, the longitudinal axes being collinear.

10. The mold unit according to claim 1, wherein the at least one guide pin comprises two guide pins that each have a longitudinal axis that extends perpendicular to the common axis, the longitudinal axes being collinear.

11. The mold unit according to claim 1, wherein the mold unit is designed for use in rotational molding,
the cavity is filled with a curable liquid material and the curable liquid material is cured within the cavity to mold a product having the desired shape,
the female and male molds are disposed, during the rotational molding, such that the male mold is situated above the female,
prior to the rotational molding, the male mold is released from the female mold with a recess of the female mold filled with the liquid material, and
after the rotational molding starts, the male mold is brought into contact with the female mold thereby forming the cavity.

12. A mold unit, comprising:
a female mold,
a male mold configured to be at least partially insertable in the female mold, the male mold being rotatable relative to the female mold about a rotational axis and being axially movable relative to the female mold along an axial direction defined by the rotational axis,
at least one guide pin configured to integrally move with one of the female mold and the male mold,
an elongated guide surface configured to integrally move with the other of the female mold and the male mold, and
an elastic member configured to bias the male mold in a direction away from the female mold,
wherein the elongated guide surface has a first portion that is circumferentially and axially displaced from a second portion, the first and second portions being defined such that:
(i) when the male mold is located at a first rotational position relative to the female mold where the at least one guide pin is abuttable against the first portion, the male mold is blocked from axially moving to a closed mold position that is its closest position to the female mold in the axial direction such that the mold unit is held at an open mold position, and
(ii) when the male mold is located at a second rotational position relative to the female mold where the at least one guide pin is axially aligned with the second portion, the male mold is axially movable to the closed mold position, by overcoming the bias of the elastic member.

13. The mold unit according to claim 12, wherein the at least one guide pin has a longitudinal axis that extends perpendicular to the rotational axis.

14. The mold unit according to claim 12, wherein the elongated guide surface is defined on an axially facing end of a cylindrical wall that is fixedly or integrally connected with the female mold.

15. The mold unit according to claim 1, further comprising a mounting structure on which the female and male molds may be mounted, the mounting structure including a motor which drives the female and male molds to rotate about the rotational axis, and structure facilitating rotation of the common axis around an orbital axis of the mold unit.

16. The mold unit according to claim 12, further comprising a mounting structure on which the female and male molds may be mounted, the mounting structure including a motor which drives the female and male molds to rotate about the rotational axis, and structure facilitating rotation of the common axis around an orbital axis of the mold unit.

17. The mold unit according to claim 1, wherein the elastic member comprises a spring.

18. The mold unit according to claim 12, wherein the elastic member comprises a spring.

19. A mold unit comprising:
a female mold and a male mold rotatably shiftable between a first configuration in which a portion of the male mold is spaced from a portion of the female mold by a first distance, the male mold and the female mold in the first configuration defining a cavity having a desired shape, and a second configuration in which the portion of the male mold is spaced from the portion of the female mold by a second distance greater than the first distance, the female mold and the male mold being supported so as to be axially movable relative to each other along a direction of a common axis, and so as to be rotatable relative to each other about the common axis;
at least one guide pin configured to move integrally with one of the female mold and the male mold;
a guide surface configured to move integrally with the other of the female mold and the male mold, the at least one guide pin contacting the guide surface and being slidably moveable along the guide surface; and
a spring;
the mold unit being configured such that the spring opposes movement of the male mold toward the female mold when the female mold and the male mold are in the first configuration and such that the spring does not oppose movement of the male mold toward the female mold when the female mold and male mold are in the second configuration.

* * * * *